(12) United States Patent
Ogawa et al.

(10) Patent No.: US 9,830,420 B2
(45) Date of Patent: Nov. 28, 2017

(54) SUPPORT DEVICE, DESIGN SUPPORT METHOD, AND PROGRAM

(71) Applicant: NEC Corporation, Tokyo (JP)

(72) Inventors: Masashi Ogawa, Tokyo (JP); Manabu Kusumoto, Tokyo (JP); Hisashi Ishida, Tokyo (JP)

(73) Assignee: NEC Corporation, Tokyo (JP)

( * ) Notice: Subject to any disclaimer, the term of this patent is extended or adjusted under 35 U.S.C. 154(b) by 202 days.

(21) Appl. No.: 14/761,729

(22) PCT Filed: Jan. 14, 2014

(86) PCT No.: PCT/JP2014/050440
§ 371 (c)(1),
(2) Date: Jul. 17, 2015

(87) PCT Pub. No.: WO2014/112469
PCT Pub. Date: Jul. 24, 2014

(65) Prior Publication Data
US 2015/0363538 A1    Dec. 17, 2015

(30) Foreign Application Priority Data
Jan. 17, 2013    (JP) .................................. 2013-005962

(51) Int. Cl.
*G06F 17/50*    (2006.01)
(52) U.S. Cl.
CPC ...... *G06F 17/5081* (2013.01); *G06F 17/5036* (2013.01); *G06F 2217/78* (2013.01)
(58) Field of Classification Search
USPC ........................................................ 716/137
See application file for complete search history.

(56) References Cited

U.S. PATENT DOCUMENTS

2008/0072194 A1*    3/2008    Katagiri .............. G06F 17/5036
                                                                         716/115
2008/0244488 A1    10/2008    Okumura
(Continued)

FOREIGN PATENT DOCUMENTS

JP    2005-251223 A    9/2005
JP    2008-250630 A    10/2008
(Continued)

OTHER PUBLICATIONS

International Search Report corresponding to PCT/2014/050440, dated Apr. 22, 2014 (3 pages).

*Primary Examiner* — Bryce Aisaka
(74) *Attorney, Agent, or Firm* — Wilmer Cutler Pickering Hale and Dorr LLP

(57)    ABSTRACT

A design support device having a permissible power supply fluctuation deriving unit and a target impedance deriving unit. The permissible power supply fluctuation deriving unit derives the fluctuation in the power supply voltage that is permissible on the basis of jitter-voltage correlation information, which indicates the correlation between the power supply voltage fluctuation generated in an I/O buffer and the jitter generated by the power supply voltage fluctuations, and jitter constraint information, which is for stably transmitting a signal, for the generated jitter. The target impedance deriving unit derives a target impedance in the permissible range of impedance for a power supply circuit, on the basis of information on the signal operating current flowing through the power supply circuit of the I/O buffer, and the power supply voltage fluctuation.

10 Claims, 17 Drawing Sheets

(56) References Cited

U.S. PATENT DOCUMENTS

| | | | |
|---|---|---|---|
| 2011/0015883 A1* | 1/2011 | Yaguchi | G06F 17/5036 |
| | | | 702/60 |
| 2012/0136598 A1* | 5/2012 | Dmitriev-Zdorov | G06F 17/5063 |
| | | | 702/65 |
| 2013/0125083 A1 | 5/2013 | Kusumoto | |

FOREIGN PATENT DOCUMENTS

| | | |
|---|---|---|
| JP | 2009-223885 A | 10/2009 |
| WO | WO-2012/014597 A1 | 2/2012 |

* cited by examiner

| jitter ΔV | type 1 | type 2 | ... |
|---|---|---|---|
| a | A1 | A2 | |
| b | B1 | B2 | ... |
| c | C1 | C2 | |
| d | D1 | D2 | |
| ⋮ | ⋮ | ⋮ | |

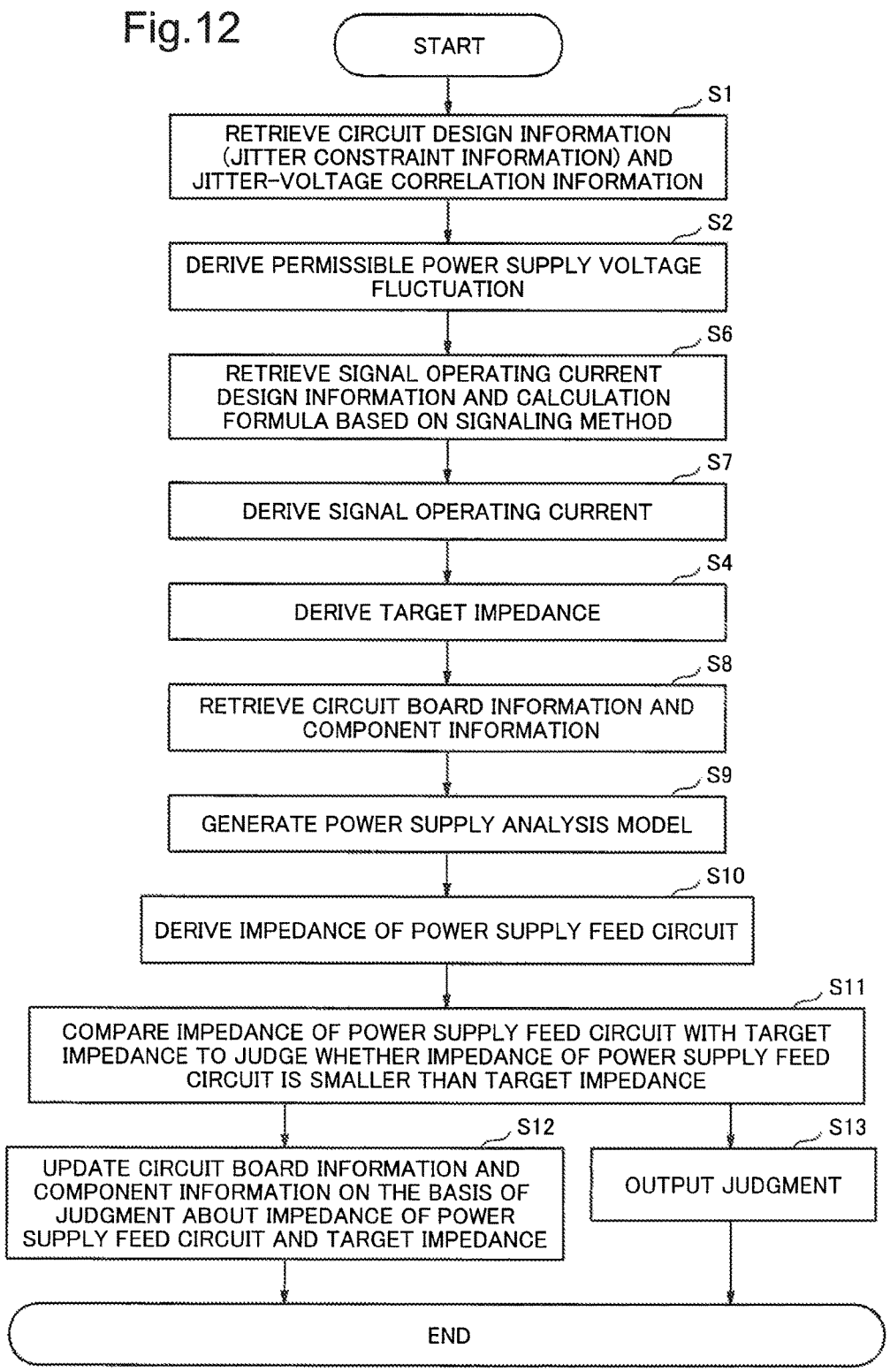

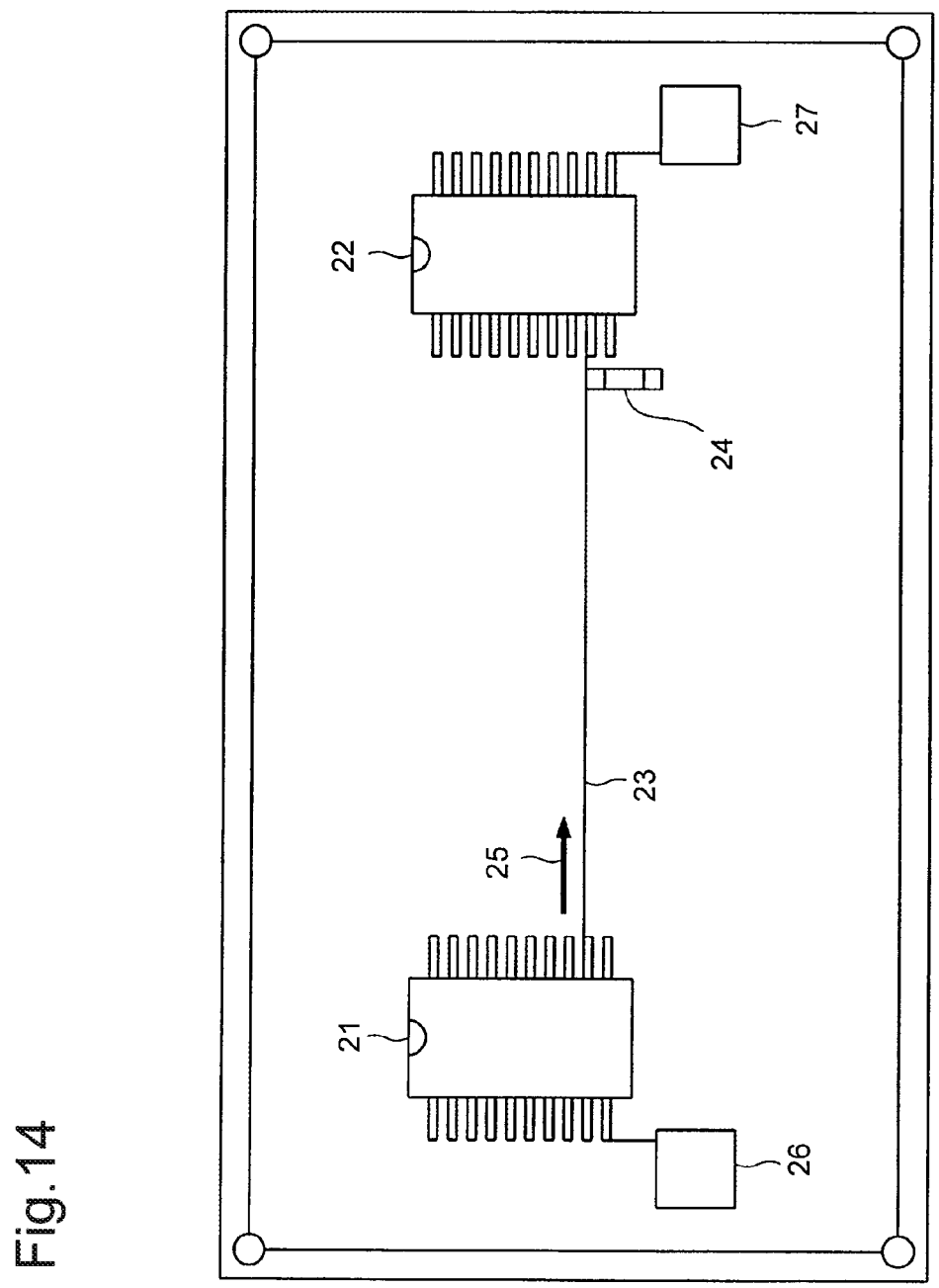

SUPPORT DEVICE, DESIGN SUPPORT METHOD, AND PROGRAM

CROSS-REFERENCE TO RELATED APPLICATIONS

This application is a national stage application of International Application No. PCT/JP2014/050440 entitled "Design Support Device, Design Support Method, and Program," filed on Jan. 14, 2014, which claims the benefit of the priority of Japanese Patent Application No. 2013-005962, filed on Jan. 17, 2013, the disclosures of each of which are hereby incorporated by reference in their entirety.

TECHNICAL FIELD

The present invention relates to a design support device, a design support method and a design support program for designing a structure of a printed circuit board.

Background Art

There is a growing demand for higher operating speeds and lower operating voltages for LSI (Large Scale Integration) mounted on a printed circuit board (hereinafter referred to as PCB), and allowable noise (noise margins) in operation of the LSI is decreasing. In addition, because of the demands for reduction of time between the start of development of products and shipment of the products, reduction of rework of PCB designs is demanded. Accordingly, it is important to design a PCB using a simulator or the like so that the LSI meets specifications and operates stably in an early stage of product design.

In particular, for stable signal transmitting operations between LSIs interconnected on a PCB, fluctuations in power supply voltage supplied to I/O (Input/Output) buffers, which are circuits for signal transmission in the LSIs, need to be kept within a permissible range within which the LSIs stably operate. In order to keep power supply voltage fluctuations in the I/O buffers (hereinafter referred to as I/O power supply voltage fluctuations), the impedance of a power supply circuit, including interconnects in the PCB, the package, the LSIs, from the power supply to the power supply terminals of the I/O buffers need to be equal to or less than a target value (hereinafter the target value is referred to as a target impedance).

PTL 1 describes a technique that derives equivalent circuit models of a power supply circuit and a ground circuit by electromagnetic field analysis after the completion of layout of a PCB and reduces the impedance of the power supply circuit to a target impedance or less on the basis of an estimation equation using optimum types, arrangement and the number of mounted components as parameters.

PTL 2 describes a technique that converts power supply circuit out of layout information about an entire PCB to electric circuit information and derives the impedance of a power supply circuit, such as an impedance characteristic from a power supply terminal of an LSI.

CITATION LIST

Patent Literature

PTL 1: Japanese Laid-Open Patent Publication No. 2009-223885

PTL 2: Japanese Laid-Open Patent Publication No. 2005-251223

SUMMARY OF INVENTION

Technical Problem

It is difficult to derive a target impedance using the techniques described in PTL 1 and PTL 2 because estimation of the target impedance requires a value of current flowing from an LSI, which is a noise source that has not been determined in an early stage of product design. Furthermore, the techniques described in PTL 1 and PTL 2 are not techniques that perform both of signal integrity (SI) design and power integrity (PI) design which are required in design of the power supply circuits of I/O buffers.

FIGS. 13A and 13B are diagrams illustrating the relationship between power supply voltage fluctuations and jitter in a buffer.

In general, when voltage fluctuations occur in an output from a power supply to which a circuit block is connected, timing of operation of the circuit block deviates and jitter (fluctuation or delay) in the waveform at the output will be observed. When voltage supplied to the buffer is constant as indicated by the solid line in FIG. 13A, the buffer operates stably.

In reality, however, power supply voltage fluctuations occur due to the impedance of the power supply circuit and the voltage actually supplied to the buffer varies as indicated by the dashed curve in FIG. 13A because switching operations of the buffer itself cause current to flow through the power supply circuit.

In this case, since the buffer switches without being supplied with a constant voltage, waveforms at the output are distorted and jitter occurs as a timing deviation as illustrated in FIG. 13B. Especially in I/O buffers of an LSI, jitter needs to be minimized within an allowable range of time in order to stably transmit a signal and the permissible range of power supply voltage fluctuations is determined since the signal at the output end of a driver (a transmitting-side buffer) is transmitted to the input end of a receiver (a receiving-side buffer).

Accordingly, to design the power supply circuit of an I/O buffer, a target impedance needs to be provided by taking into consideration PI design and SI design that take into account the number of I/O buffers required for stable signal transmission and a permissible range of jitter.

An object of the present invention is therefore to provide a design support device, a design support method and a design support program that derive a target impedance required for an LSI to stably operate in a power supply circuit of a PCB on which the LSI is mounted.

Solution to Problem

To achieve the object described above, a design support device according to an exemplary embodiment of the present invention includes a permissible power supply fluctuation deriving unit deriving a permissible power supply voltage fluctuation on the basis of jitter-voltage correlation information indicating correlation between a power supply voltage fluctuation occurring in an I/O buffer and jitter generated by the power supply voltage fluctuation and jitter constraint information for stably transmitting a signal against generated jitter, and a target impedance deriving unit deriving a target impedance which is an impedance of the power supply circuit in a permissible range on the basis of information indicating a signal operating current flowing through a power supply circuit of the I/O buffer and the power supply voltage fluctuation.

A design support method according to an exemplary embodiment of the present invention involves deriving a permissible power supply voltage fluctuation on the basis of jitter-voltage correlation information indicating correlation between a power supply voltage fluctuation occurring in an I/O buffer and jitter generated by the power supply voltage fluctuation and jitter constraint information for stably transmitting a signal against generated jitter, and deriving a target impedance which is an impedance of the power supply circuit in a permissible range on the basis of information indicating a signal operating current flowing through a power supply circuit of the I/O buffer and the power supply voltage fluctuation.

A program according to an exemplary embodiment of the present invention causes a computer of a printed circuit board design support device to function as a permissible power supply fluctuation deriving means for deriving a permissible power supply voltage fluctuation on the basis of jitter-voltage correlation information indicating correlation between a power supply voltage fluctuation occurring in an I/O buffer and jitter generated by the power supply voltage fluctuation and jitter constraint information for stably transmitting a signal against generated jitter, and a target impedance deriving means for deriving a target impedance which is an impedance of the power supply circuit in a permissible range on the basis of information indicating a signal operating current flowing through a power supply circuit of the I/O buffer and the power supply voltage fluctuation.

Advantageous Effects of Invention

The present invention enables easy estimation of a target impedance which is an impedance of a power supply circuit in a permissible range.

BRIEF DESCRIPTION OF DRAWINGS

FIG. 12 is a flowchart illustrating a process performed by the design support device according to the fourth exemplary embodiment of the present invention.

FIG. 14 is a plan view illustrating a PCB designed using the design support device according to the fourth exemplary embodiment.

DESCRIPTION OF EXEMPLARY EMBODIMENTS

Figure 1:
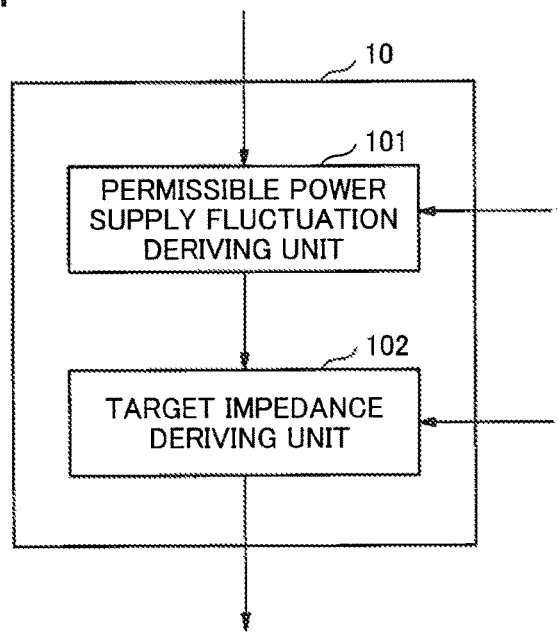
FIG. 1 is a block diagram illustrating a design support device according to an exemplary embodiment of the present invention.

FIG. 1 is a functional block diagram illustrating a minimum configuration of a design support device 10 of the present invention.

The design support device 10 of the present invention includes at least a permissible power supply fluctuation deriving unit 101 and a target impedance deriving unit 102 as illustrated in FIG. 1.

A control unit (for example a CPU: Central Processing Unit) executes a program to implement the following functions of the permissible power supply fluctuation deriving unit 101 and the target impedance deriving unit 102 to configure the design support apparatus 10.

The permissible power supply fluctuation deriving unit 101 is a functional unit that derives a permissible power supply voltage fluctuation on the basis of jitter-voltage correlation information representing a correlation between power supply voltage fluctuations that occur in an I/O buffer and jitter generated by the power supply voltage fluctuations and jitter constraint information for stably transmitting a signal against the generated jitter. The term jitter constraint as used herein refers to a permissible range of jitter for a signal to be stably transmitted in an LSI. Power supply voltage fluctuations in the I/O buffer which can be obtained on the basis of the jitter constraints are derived as power supply voltage fluctuations that occur in the I/O buffer.

The target impedance deriving unit 102 derives a target impedance which is an impedance of a power supply circuit of an I/O buffer in a permissible range on the basis of information indicating a signal operating current flowing through the power supply circuit and a permissible power supply voltage fluctuation. The signal operating current is a current flowing through the power supply circuit of the I/O buffer.

The target impedance is an impedance of the power supply circuit of the I/O buffer in a permissible range. The target impedance is needed for keeping power supply voltage fluctuations in the I/O buffer in a permissible range and is a property that needs to be met in design. The target impedance property is based on a property of a signal operating current flowing through the power supply circuit of the I/O buffer. For example, if the signal operating current is a frequency-dependent property, the target impedance is also a frequency-dependent property.

First Exemplary Embodiment

Figure 2:
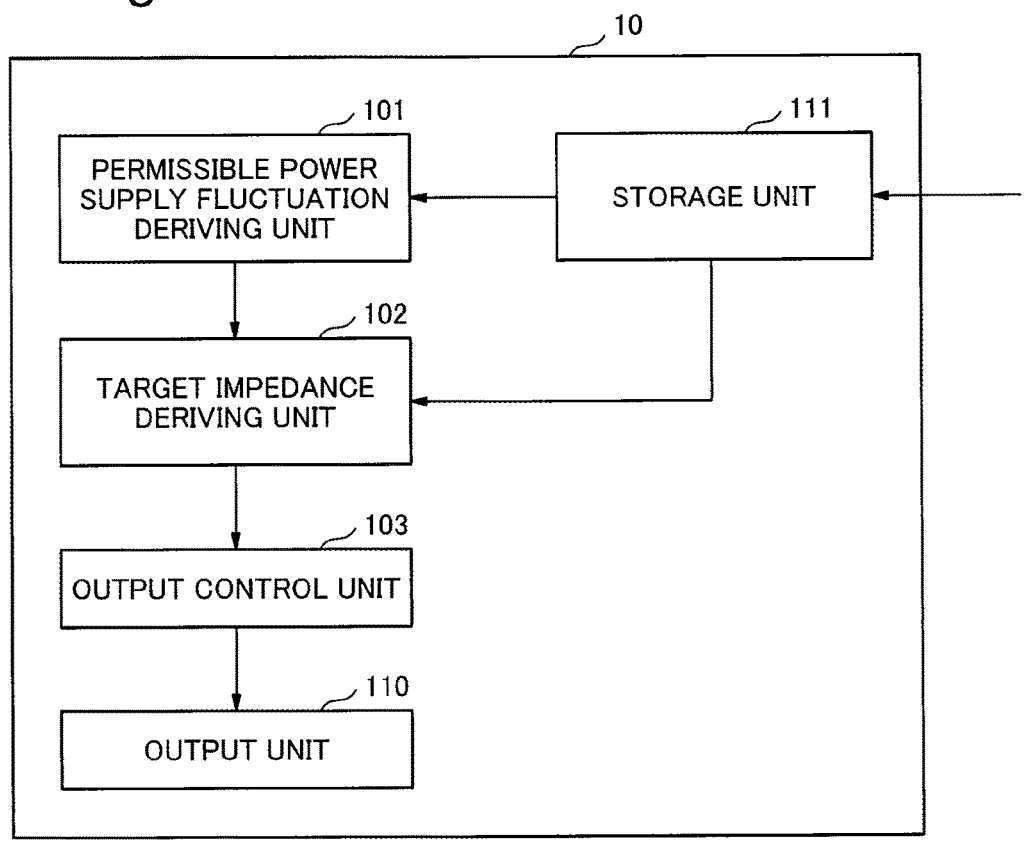
FIG. 2 is a block diagram illustrating a design support device according to first and second exemplary embodiments of the present invention.

FIG. 2 is a diagram illustrating a configuration of the design support device 10 according to a first exemplary embodiment of the present invention.

As illustrated in FIG. 2, the design support device 10 according to the first exemplary embodiment includes an output control unit 103, an output unit 110 and a storage unit 111 in addition to the functions of the minimum configuration of the design support device 10 illustrated in FIG. 1.

The output control unit 103 is a functional unit that outputs a target impedance derived by the target impedance deriving unit 102 to the output unit 110. For example, if the output unit 110 is a display unit such as a liquid-crystal panel, the output control unit 103 may display the target impedance as a graph on the display unit.

The output unit 110 may be a display unit, for example, which takes an input of a target impedance from the output control unit 103 and displays the target impedance on the display unit.

The storage unit 111 is a storage unit that stores various items of data, such as information such as jitter constraints and a signal operating current, which are circuit design information for the I/O buffer, and jitter-voltage correlation information, and programs required for operation of the design support device 10.

Figures 3, 4:
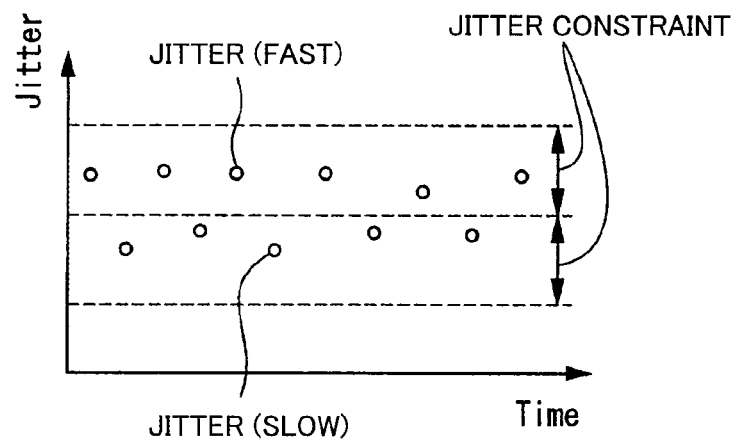
FIG. 3 is a graph illustrating an example of jitter constraint information stored in a storage unit depicted in FIG. 2.
FIG. 4 is a table illustrating an example of a database of jitter-voltage correlation information stored in the storage unit depicted in FIG. 2.

FIG. 3 is a diagram illustrating an example of jitter constraint information stored in the storage unit 111.

The jitter constraints are information provided beforehand by a user. The jitter constraints are a permissible range of jitter at each moment for a signal to be stably transmitted in an LSI. As illustrated in FIG. 3, the jitter constraints include a jitter constraint for fast jitter that quicken signal transmission with respect to a reference jitter with which a signal is stably transmitted and a jitter constraint for slow jitter that slows signal transmission. The jitter constraints are one of design specifications of an LSI that can be provided in an early stage of PCB design and an LSI needs to be designed so that the LSI satisfies the jitter constraints in order for a signal to be stably transmitted in the LSI.

FIG. 4 is a table illustrating an example of a database of jitter-voltage correlation information stored in the storage unit 111.

The jitter-voltage correlation information is information provided by a user beforehand. The jitter-voltage correlation information is information representing how much jitter is caused with respect to a power supply voltage fluctuation $\Delta V$ in an I/O buffer. A library of jitter-voltage correlation information is made for each of types of I/O buffers categorized by different operating voltages and signaling methods (single-ended signaling/differential signaling) as illustrated in FIG. 4 and the libraries are stored in the storage unit 111 as a database from which selection can be made by a user in accordance with an I/O buffer used in an LSI.

A library of the jitter-voltage correlation information may be generated for each of types of I/O buffers on the basis of results of measurement and analysis of LSIs designed in the past and may be stored in the storage unit 111 as a database from which selection can be made for an I/O buffer used by the user in an LSI. This enables the user to reuse the database when the user designs a new PCB that uses LSIs built to the same specifications or LSIs that are in the same lineup and, in addition, enables fast estimation of an accurate target impedance in an early stage of the PCB design.

Figure 5:
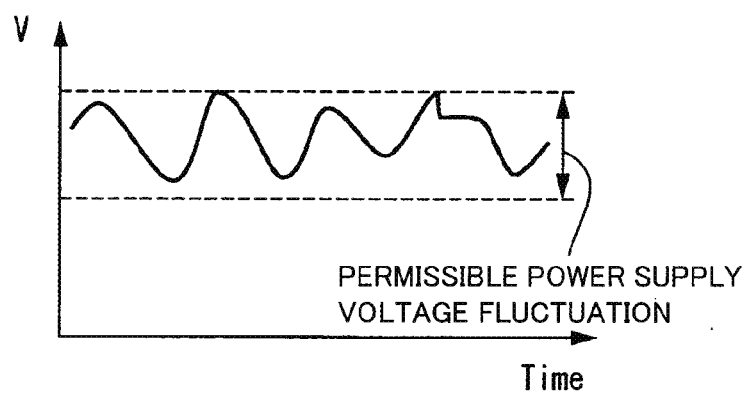
FIG. 5 is a graph illustrating an example of permissible power supply voltage fluctuations in an I/O buffer derived by a permissible power supply fluctuation deriving unit depicted in FIG. 2.

FIG. 5 is a diagram illustrating an example of permissible power supply voltage fluctuations in an I/O buffer.

The permissible power supply fluctuation deriving unit 101 derives a permissible power supply voltage fluctuation (hereinafter referred to as a permissible power supply voltage fluctuation) for an I/O buffer on the basis of jitter-voltage correlation information and jitter constraint information. The permissible power supply fluctuation deriving unit 101 can derive a permissible power supply voltage fluctuation for an I/O buffer from the database illustrated in FIG. 4.

For example, if the user uses an I/O buffer of type 1 in an LSI and a jitter constraint is A1, the permissible power supply fluctuation deriving unit 101 reads the database illustrated in FIG. 4 from the storage unit 111 and derives a power supply voltage fluctuation $\Delta V$ of a for the I/O buffer. It can be seen from the database illustrated in FIG. 4 that if the user uses an I/O buffer of type 1 in the LSI and the power supply voltage fluctuation $\Delta V$ of the I/O buffer is a, the jitter constraint is A1.

If the user uses an I/O buffer of type 2 in an LSI and a jitter constraint is D2, the permissible power supply fluctuation deriving unit 101 reads the database illustrated in FIG. 4 from the storage unit 111 and derives a power supply voltage fluctuation $\Delta V$ of d for the I/O buffer. If the user uses an I/O buffer of type 2 in an LSI and the power supply voltage fluctuation $\Delta V$ of the I/O buffer is c, a jitter constraint, C2, can be obtained from the database illustrated in FIG. 4.

Note that if there is not an appropriate data combination of permissible power supply voltage fluctuation and jitter constraint in the database stored in the storage unit 111, the permissible power supply fluctuation deriving unit 101 may interpolate data in the database to generate an appropriate new data combination of permissible power supply voltage fluctuation and jitter constraint and may derive a permissible power supply voltage fluctuation for the I/O buffer.

Figure 6:
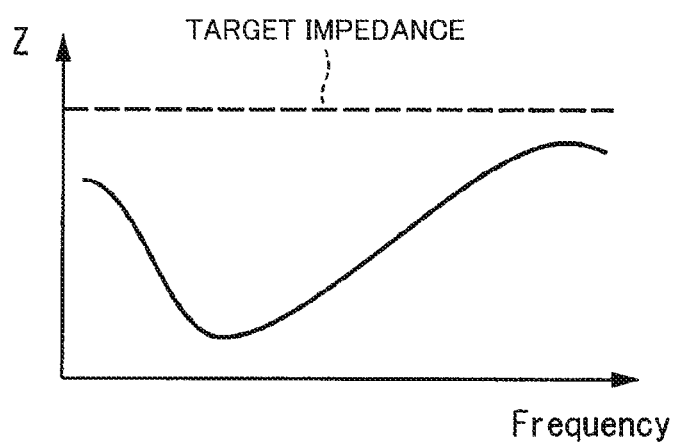
FIG. 6 is a graph illustrating an example of a target impedance derived by a target impedance deriving unit depicted in FIG. 2.

FIG. 6 is a diagram illustrating an example of a target impedance derived by the target impedance deriving unit 102.

The target impedance deriving unit 102 derives a target impedance on the basis of information indicating a signal operating current flowing through the power supply circuit of an I/O buffer and a permissible power supply voltage fluctuation. The target impedance deriving unit 102, for example, can retrieve Equation (1) representing a target impedance Zti stored in the storage unit 111 and can substitute a signal operating current (absolute value) provided by the user beforehand and a permissible power supply voltage fluctuation (absolute value) derived by the permissible power supply fluctuation deriving unit 101 into retrieved Equation (1) to derive a target impedance Zti for the power supply circuit of an I/O buffer in a PCB.

[Math. 1]

$$Zti = Vdr/Ii \qquad (1)$$

Here, Ii in Equation (1) is a signal operating current (absolute value) provided by the user beforehand and Vdr is a permissible power supply voltage fluctuation and corresponds to the power supply voltage fluctuation $\Delta V$ in the I/O buffer in FIG. 5.

Equation (1) comes from Ohm's law and represents the relationship in which the more signal operating current Ii flows, the smaller the target impedance Zti is, or the more stringently (the smaller) the permissible power supply voltage fluctuation Vdr is estimated, the smaller the target impedance Zti is.

In this way, the target impedance deriving unit 102 can derive a target impedance for the power supply circuit of an I/O buffer in a PCB.

Figure 7:
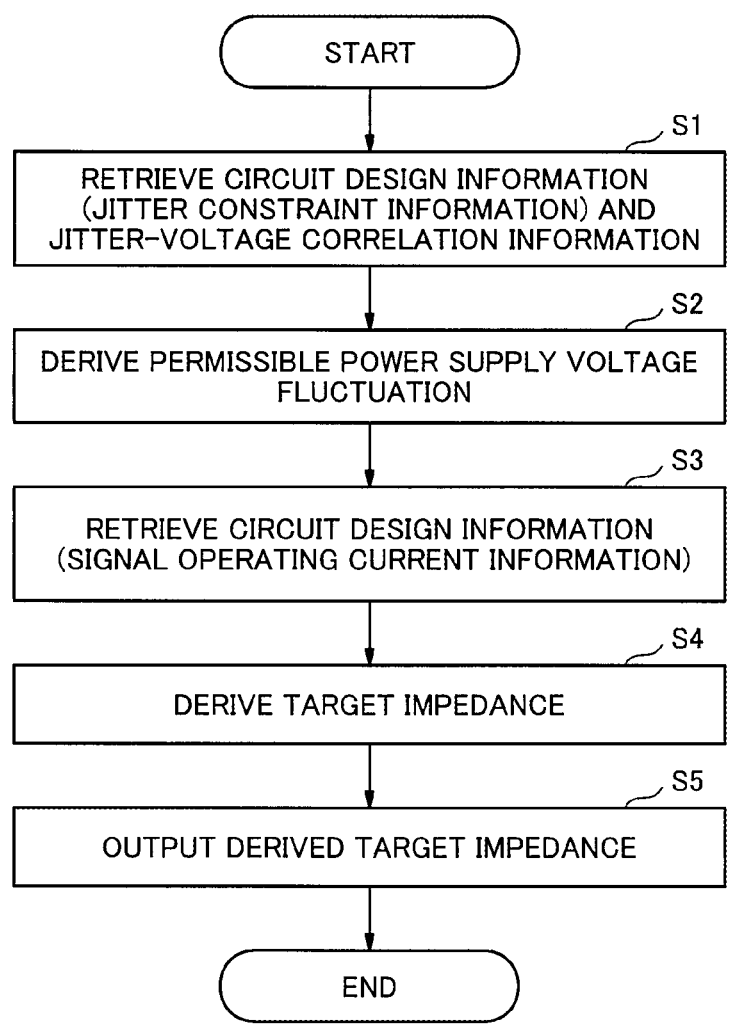
FIG. 7 is a flowchart illustrating a process performed by the design support device according to the first and second exemplary embodiments of the present invention.

FIG. 7 is a diagram illustrating a processing flow in the design support device 10 according to the first exemplary embodiment of the present invention.

A processing flow in the design support device 10 according to the first exemplary embodiment will be described below with an example in which the design support device 10 derives a target impedance on the basis of various items of information stored in the storage unit 111.

First, the user performs a user operation on an external writer device, for example, that records data in a storage unit to write circuit design information (jitter constraint information and signal operating current information) concerning an I/O buffer in the storage unit 111 of the design support device 10. Similarly, the user performs a user operation on the external writer device to write jitter-voltage correlation information in the storage unit 111 of the design support device 10.

Then the permissible power supply fluctuation deriving unit 101 of the design support device 10 retrieves the circuit design information (jitter constraint information) for the I/O buffer from the storage unit 111 (step S1). The permissible power supply fluctuation deriving unit 101 also retrieves the jitter-voltage correlation information from the storage unit 111 (step S1).

The permissible power supply fluctuation deriving unit 101 then derives a permissible power supply voltage fluctuation on the basis of the jitter-voltage correlation information and the jitter constraint information, which is circuit design information for the I/O buffer, retrieved from the storage unit 111 (step S2). For example, if the user uses an I/O buffer of type 1 in an LSI and a jitter constraint is A1, the permissible power supply fluctuation deriving unit 101 reads the database illustrated in FIG. 4 from the storage unit 111 and derives a power supply voltage fluctuation $\Delta V$ of a for the I/O buffer. The permissible power supply fluctuation deriving unit 101 then outputs information indicating the derived permissible power supply voltage fluctuation to the target impedance deriving unit 102.

The target impedance deriving unit 102 takes an input of the permissible power supply voltage fluctuation from the permissible power supply fluctuation deriving unit 101 and retrieves the circuit design information (signal operating current information) for the I/O buffer from the storage unit 111 (step S3).

The target impedance deriving unit 102 then implements the function of executing division on the basis of information indicating a permissible power supply voltage fluctuation and signal operating current information, which is circuit design information for the I/O buffer, for example, by hardware, and divides the permissible power supply voltage fluctuation (absolute value) by the signal operating current (absolute value) to derive a target impedance (step S4). Alternatively, for example, the target impedance deriving unit 102 may retrieve Equation (1) representing a target impedance Zti stored in the storage unit 111 and may substitute the signal operating current and the permissible power supply voltage fluctuation into retrieved Equation (1) to derive a target impedance Zti for the power supply circuit of the I/O buffer in the PCB. The target impedance deriving unit 102 then outputs information indicating the derived target impedance to the output control unit 103.

The output control unit 103 takes an input of the information indicating the target impedance from the target impedance deriving unit 102 and outputs the target impedance to the output unit 110 on the basis of the input information indicating the target impedance (step S5). For example, if the information indicating the target impedance input by the output control unit 103 is text information, the output control unit 103 outputs the target impedance as text to the output unit 110.

The processing flow in the design support device 10 according to an exemplary embodiment of the present invention has been described. The processing by the design support device 10 described above has the advantageous effects of enabling easy estimation of a target impedance which is an impedance of a power supply circuit in a permissible range in an early stage of PCB design, thereby reducing the number of man-hours for PCB design and PCB manufacturing cost.

Furthermore, the processing by the design support device 10 described above estimates a more stringent (smaller) target impedance for a greater signal operating current or a severer permissible power supply voltage fluctuation condition, and thus a target impedance that corresponds to actual design of the power supply circuit of an I/O buffer can be obtained.

Second Exemplary Embodiment

A design support device 10 according to a second exemplary embodiment of the present invention will be described next.

The design support device 10 according to the second exemplary embodiment of the present invention has the same configuration as the design support device 10 according to the first exemplary embodiment illustrated in FIG. 2 and therefore the description of the configuration will be omitted. In the processing flow of the design support device 10 according to the second exemplary embodiment, Jitter-voltage correlation information used by a permissible power supply fluctuation deriving unit 101 according to the second exemplary embodiment is a jitter-voltage correlation equation represented by an approximation equation provided for each I/O buffer and has form different from the jitter-voltage correlation information used by the permissible power supply fluctuation deriving unit 101 according to the first exemplary embodiment.

The jitter-voltage correlation equation which is a calculation equation used by the permissible power supply fluctuation deriving unit 101 according to the second exemplary embodiment will be described below in detail.

Figure 8:
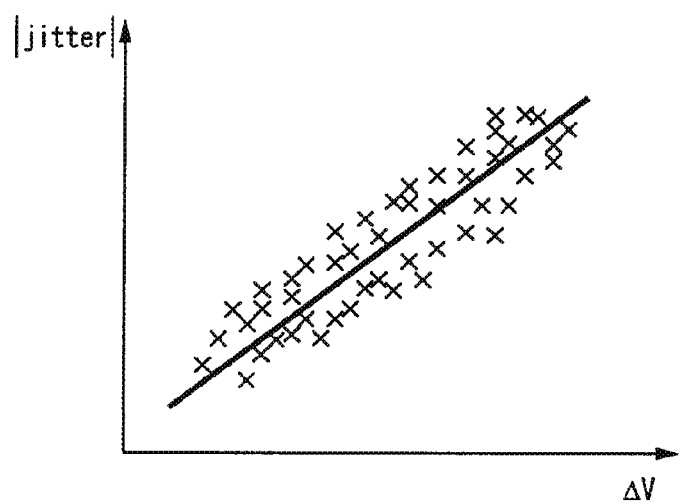
FIG. 8 is a graph illustrating an example of a jitter-voltage correlation equation stored in the storage unit in the second exemplary embodiment of the present invention.

FIG. 8 is a graph illustrating an example of a jitter-voltage correlation equation stored in a storage unit 111.

The storage unit 111 stores jitter-voltage correlation equations for a plurality of I/O buffers in which a power supply voltage fluctuation and jitter are in one-to-one correspondence in association with identifiers each corresponding to each lineup of LSIs.

The jitter-voltage correlation equations have been derived from characteristics measured on PCBs having similar LSIs mounted on them or characteristics derived using equivalent circuit models on the basis of an approximation equation representing correlation. A library of each of the jitter-voltage correlation equations is made for each of types of I/O buffers categorized by different I/O buffer operating voltages and signal transmission methods and is stored in the storage unit 111 as a database from which selection can be made by a user in accordance with an I/O buffer used in an LSI.

Processing at step S2 performed by the design support device 10 according to the second exemplary embodiment illustrated in FIG. 7 is processing for substituting jitter constraint information which is circuit design information for an I/O buffer into a jitter voltage correlation equation retrieved by the permissible power supply fluctuation deriving unit 101 from the storage unit 111 to derive a permissible power supply voltage fluctuation.

The solid line represented in an example of the jitter-voltage correlation equation illustrated in FIG. 8 is an approximation line (solid line) obtained by plotting power supply voltage fluctuations ΔV (the "X" marks") obtained by changing jitter conditions for jitter (measured values, analytic values) associated with power supply voltage fluctuations ΔV in an I/O buffer and applying statistical processing to the plot. In general, jitter (the absolute value) increases as ΔV increases and they are in an approximately proportional relationship. For example, let ΔV be denoted by Vd and jitter by tj, then the approximation line can be written as Equation (2).

[Math. 2]

$$tj = a \times Vd + b \quad (2)$$

In Equation (2), a is the gradient of the line and b represents an intercept on the jitter axis of the approximation line.

When jitter is 0, the relational expression representing the relationship between power supply voltage fluctuation ΔV and jitter ideally includes the origin and the approximation line represented by Equation (2) obtained from measured values has an intercept near the origin. Accordingly, the value of b in Equation (2) is approximately 0 and is negligible in approximation equation (2).

Therefore, by assigning a jitter constraint tjr to tj and a permissible power supply voltage fluctuation Vdr of an I/O buffer to Vd in Equation (2), the permissible power supply voltage fluctuation Vdr can be written as Equation (3).

[Math. 3]

$$Vdr = |tjr/a| \quad (3)$$

Note that while Vdr can take a negative value, the value of Vdr is derived as an absolute value because an absolute quantity of fluctuation is necessary.

While the approximation line represented by Equation (2) has been obtained by plotting power supply voltage fluctuations ΔV obtained by changing jitter conditions and applying statistical processing to the plot, a permissible power supply voltage fluctuation Vdr may be obtained by obtaining a power supply voltage fluctuation ΔV in the worst case where the design conditions are severest from the plot. With this, a target impedance that corresponds to the worst case can be obtained and a product that is robust against changes in conditions such as ambient temperature changes and power supply voltage fluctuations can be designed.

Note that the processing performed by the design support device 10 according to the second exemplary embodiment is the same as the processing performed by the design support device 10 according to the first exemplary embodiment except the processing at step S2.

The processing flow in the design support device 10 according to an exemplary embodiment of the present invention has been described. The processing by the design support device 10 described above has the advantageous effects of enabling easy estimation of a target impedance which is an impedance of a power supply circuit in a permissible range in an early stage of PCB design, thereby reducing the number of man-hours for PCB design and PCB manufacturing cost.

Third Exemplary Embodiment

Figure 9:
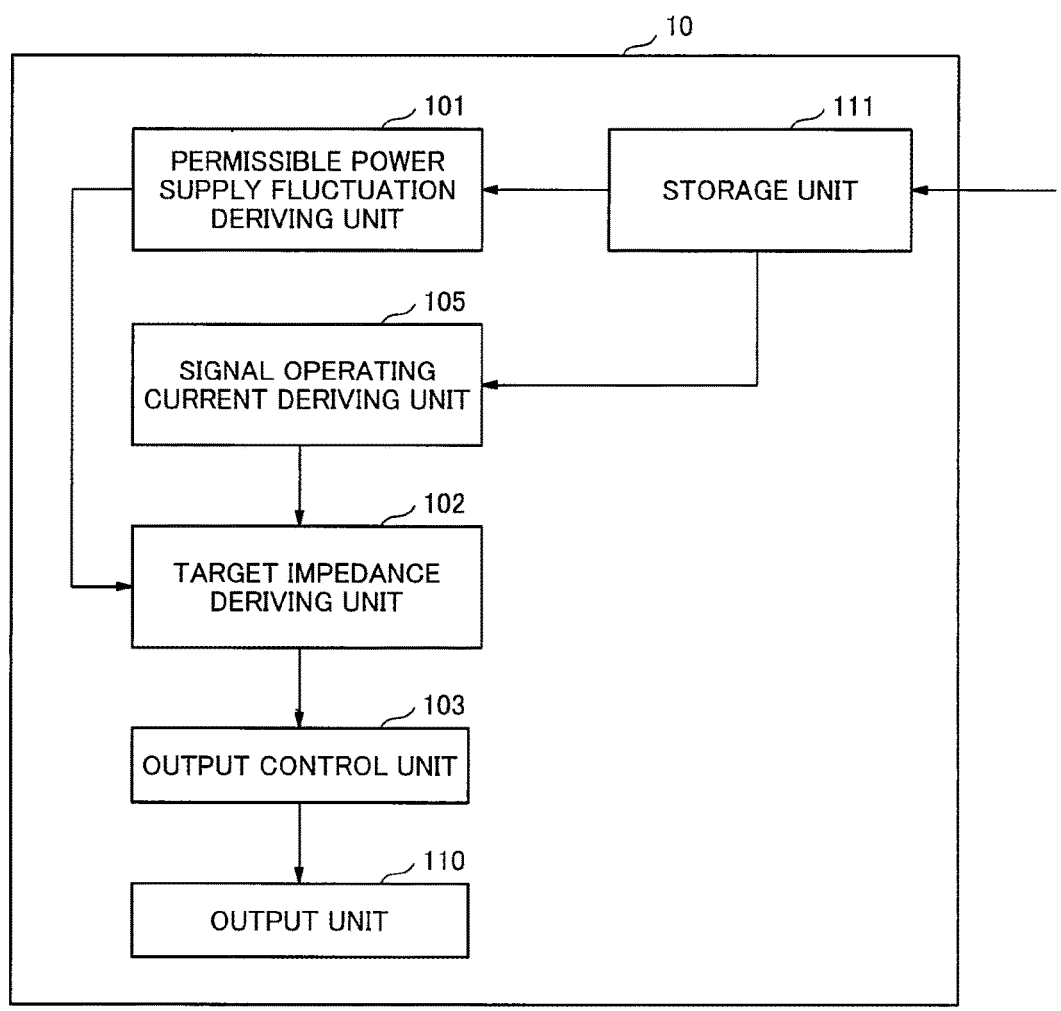
FIG. 9 is a block diagram illustrating a design support device according to a third exemplary embodiment of the present invention.

FIG. 9 is a diagram illustrating a configuration of a design support device 10 according to a third exemplary embodiment of the present invention.

As illustrated in FIG. 9, the design support device 10 according to the third exemplary embodiment includes a signal operating current deriving unit 105 in addition to the functions representing the configuration of the design support device 10 according to the first exemplary embodiment illustrated in FIG. 2.

The signal operating current deriving unit 105 is a functional unit that derives a signal operating current from signal operating current design information such as an operating voltage of an I/O buffer, a termination condition of an I/O receiver, the number of switching operations of the I/O buffer, and a signal transmission method for the I/O buffer by using a calculation equation based on a signal transmission method provided beforehand.

If the user cannot provide signal operating current information beforehand, the signal operating current deriving unit 105 can retrieve Equation (4) representing a signal operating current Ii stored in a storage unit 111, for example, and substitute signal operating current design information such as an operating voltage of an I/O buffer used in an LSI, termination conditions of an I/O receiver, the number of switching operations, and a signal transmission method into retrieved Equation (4) to derive a signal operating current Ii in a simple manner.

[Math. 4]

$$Ii = Vi \times Nd / Zr \quad (4)$$

In Equation (4), Vi is an operating voltage of the I/O buffer, Nd is the number of switching operations of the I/O buffer, and Zr is an input impedance that takes into account the termination condition of the I/O receiver. Furthermore, Equation (4) is a equation for deriving a signal operating current Ii when the signal transmission method is single-ended signaling.

A equation for deriving a signal operating current Ii when the signal transmission method is differential signaling is represented by Equation (5). Like Equation (4), this equation is stored in the storage unit 111.

[Math. 5]

$$Ii = Vi \times Nd/Zr/2 \quad (5)$$

In this way, the signal operating current deriving unit 105 derives a signal operating current Ii and outputs information indicating the derived signal operating current Ii to the target impedance deriving unit 102.

The target impedance deriving unit 102 takes an input of the signal operating current information from the signal operating current deriving unit 105 and derives a target impedance on the basis of information indicating a permissible power supply voltage fluctuation from a permissible power supply fluctuation deriving unit 101.

Figure 10:
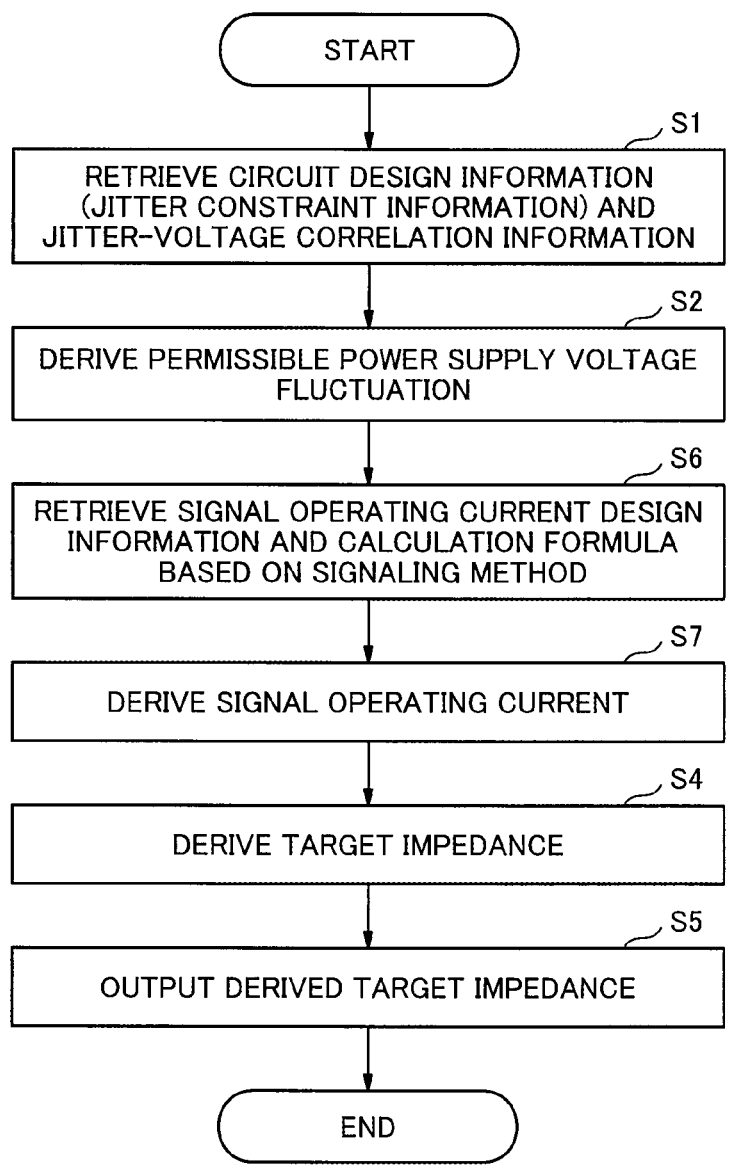
FIG. 10 is a flowchart illustrating a process performed by the design support device according to the third exemplary embodiment of the present invention.

FIG. 10 is a flowchart illustrating a processing flow in the design support device 10 according to the third exemplary embodiment of the present invention.

The processing flow in the design support device 10 according to the third exemplary embodiment will be described with an example in which the design support device 10 derives a target impedance on the basis of various items of information stored in the storage unit 111.

First, the user performs a user operation on an external writer device, for example, to write, in the storage unit 111 of the design support device 10, circuit design information for an I/O buffer (signal operating current design information such as jitter constraint information, an operating voltage of the I/O buffer, a termination condition for an I/O receiver, the number of switching operations of the I/O buffer, and a signal transmission method for the I/O buffer). Similarly, the user performs a user operation on the external writer device to write jitter-voltage correlation information in the storage unit 111 of the design support device 10.

The permissible power supply fluctuation deriving unit 101 of the design support device 10 then retrieves the circuit design information (the jitter constraint information) concerning the I/O buffer from the storage unit 111 (step S1). The permissible power supply fluctuation deriving unit 101 also retrieves the jitter-voltage correlation information from the storage unit 111 (step S1).

The permissible power supply fluctuation deriving unit 101 derives a permissible power supply voltage fluctuation on the basis of the jitter-voltage correlation information and the jitter constraint information, which is circuit design information for the I/O buffer, retrieved from the storage unit 111 (step S2). The permissible power supply fluctuation deriving unit 101 then outputs information indicating the derived permissible power supply voltage fluctuation to a target impedance deriving unit 102.

A signal operating current deriving unit 105 retrieves signal operating current design information such as the operating voltage of the I/O buffer, the termination condition for the I/O receiver, the number of switching operations of the I/O buffer, and the signal transmission method for the I/O buffer, and a calculation equation based on the signal transmission method from the storage unit 111 (step S6). The signal operating current deriving unit 105 then derives a signal operating current on the basis of the retrieved calculation equation and signal operating current design information (step S7). The signal operating current deriving unit 105 then outputs information indicating the derived signal operating current to the target impedance deriving unit 102.

The target impedance deriving unit 102 takes an input of the permissible power supply voltage fluctuation from the permissible power supply fluctuation deriving unit 101. The target impedance deriving unit 102 also takes an input of the information indicating the signal operating current from the signal operating current deriving unit 105.

The target impedance deriving unit 102 implements the function of executing division on the basis of information indicating a permissible power supply voltage fluctuation and signal operating current information, which is circuit design information for the I/O buffer, for example, by hardware, and divides the permissible power supply voltage fluctuation (absolute value) by the signal operating current (absolute value) to derive a target impedance (step S4). The target impedance deriving unit 102 then outputs information indicating the derived target impedance to an output control unit 103.

The output control unit 103 takes an input of the information indicating the target impedance from the target impedance deriving unit 102 and outputs the target impedance to the output unit 110 on the basis of the information indicating the input target impedance (step S5).

Note that the processing performed by the permissible power supply fluctuation deriving unit 101 (steps S1 and S2) and the processing performed by the signal operating current deriving unit 105 (steps S6 and S7) are independent of each other and the order in which the processing by the permissible power supply fluctuation deriving unit 101 and the processing by the signal operating current deriving unit 105 are performed can be changed.

The processing flow in the design support device 10 according to an exemplary embodiment has been described. The processing by the design support device 10 described above can derive a signal operating current when signal operating current design information such as the operating voltage of an I/O buffer, a termination condition of an I/O receiver, the number of switching operations of the I/O buffer, and a signal transmission method for the I/O buffer is provided even if signal operating current information is not available. The processing by the design support device 10 described above has the advantageous effects of enabling easy estimation of a target impedance which is an impedance of a power supply circuit in a permissible range in an early stage of PCB design, thereby reducing the number of man-hours for PCB design and PCB manufacturing cost.

Fourth Exemplary Embodiment

Figure 11:
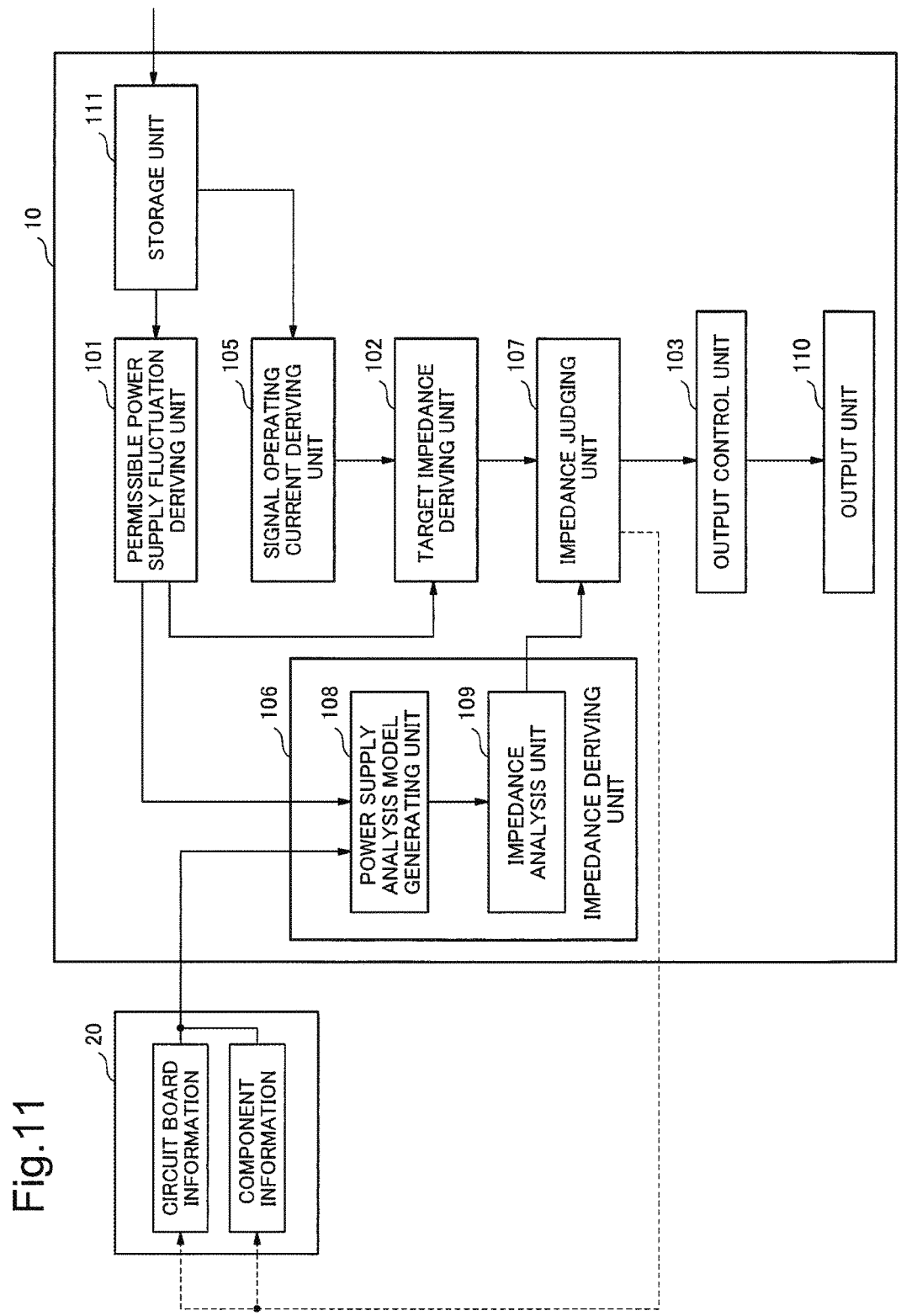
FIG. 11 is a block diagram illustrating a design support device according to a fourth exemplary embodiment of the present invention.
Figure 13A:
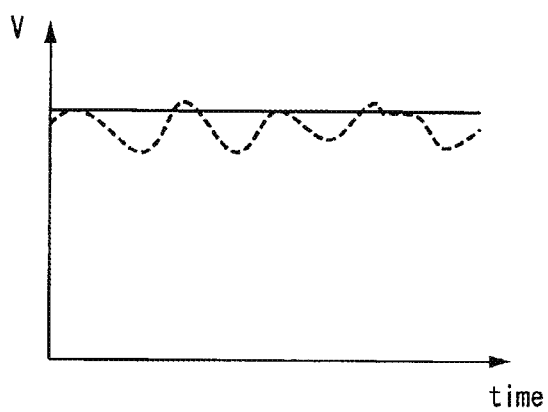
FIG. 13A is a graph illustrating voltage supplied to a typical I/O buffer.
Figure 13B:
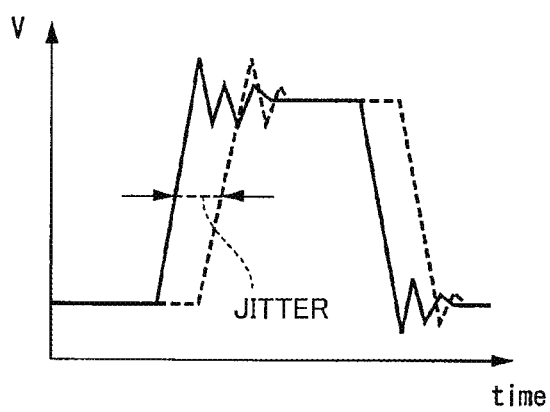
FIG. 13B is a graph illustrating the relationship between power supply voltage fluctuations and jitter in a typical I/O buffer.

FIG. 11 is a diagram illustrating a configuration of a design support device 10 according to a fourth exemplary embodiment of the present invention.

As illustrated in FIG. 11, the design support device 10 according to the fourth exemplary embodiment includes an impedance deriving unit 106 and an impedance judging unit 107 in addition to the functions representing the configuration of the design support device 10 according to the third exemplary embodiment illustrated in FIG. 9.

There is an external storage device 20 that stores circuit board information, component information and the like, provided outside the design support device 10.

A target impedance deriving unit 102 in this exemplary embodiment has the function of outputting a derived target impedance to the impedance judging unit 107.

The impedance deriving unit 106 is a functional unit that generates a power supply analysis model representing an equivalent circuit model of a power supply circuit of a printed circuit board from circuit board information including the structure and electrical characteristics of the printed circuit board and component information including the structures and electrical characteristics of components to be mounted on the printed circuit board and performs analysis using the power supply analysis model to derive an impedance of the power supply circuit.

The impedance judging unit 107 is a functional unit that compares the impedance of the power supply circuit of an I/O buffer with a target impedance to judge whether or not the impedance of the power supply circuit is smaller than the target impedance. The impedance judging unit 107 also includes the function of updating the circuit board information and the component information stored in a storage unit by reflecting the judgment.

A power supply analysis model generating unit 108 is a functional unit that generates a power supply analysis model representing an equivalent circuit model of a power supply circuit of a printed circuit board from circuit board information including the structure and electrical characteristics of the printed circuit board and component information including the structures and electrical characteristics of components to be mounted on the printed circuit board.

An impedance analysis unit 109 is a functional unit that performs analysis using a power supply analysis model to derive an impedance of a power supply circuit.

The impedance deriving unit 106 includes the power supply analysis model generating unit 108 and the impedance analysis unit 109.

The power supply analysis model generating unit 108 retrieves circuit board information including the structure and electrical characteristics of a printed circuit board and component information including the structures and electrical characteristics of components to be mounted on the printed circuit board from the external storage device 20. This call made by the power supply analysis model generating unit 108 may be triggered by a permissible power supply fluctuation deriving unit 101 or a signal operating current deriving unit 105 retrieving circuit design information for an I/O buffer from the storage unit 111, for example. Furthermore, the call made by the power supply analysis model generating unit 108 may be triggered by processing, excluding the processing by the impedance analysis unit 109, at a step performed before the impedance judging unit 107 starts processing.

The power supply analysis model generating unit 108 then generates a power supply analysis model from the circuit board information and the component information retrieved from the external storage device 20. The power supply analysis model may be any model for deriving impedance and may be a circuit analysis model used in circuit analysis using software such as SPICE (Simulation Program with Integrated Circuit Emphasis). Alternatively, the power supply analysis model may be an electromagnetic field analysis model used in electromagnetic field analysis using a method such as EDTD method (Finite-Difference Time-Domain method).

Circuit board information used by the power supply analysis model generating unit 108 when generating a power supply analysis model is CAD (Computer Aided Design) layout information, for example, used in PCB design. Component information used by the power supply analysis model generating unit 108 when generating a power supply analysis model is information about components to be mounted on a PCB to be fabricated. Techniques for extracting model parameters from such layout information and component information to generate a circuit analysis model and an electromagnetic field analysis model are used in commercially available tools as existing techniques.

Accordingly, the power supply analysis model generating unit 108 can use any of the existing techniques to generate a power supply analysis model when CAD layout information is recorded as circuit board information and information about components to be mounted on a PCB is recorded as component information on the external storage device 20.

The power supply analysis model generating unit 108 outputs the generated power supply analysis model to the impedance analysis unit 109.

The impedance analysis unit 109 takes an input of a power supply analysis model from the power supply analysis model generating unit 108 and analyzes the impedance of the power supply circuit of an I/O buffer by using the input power supply analysis model.

For example, when the power supply analysis model input by the impedance analysis unit 109 is a circuit analysis model using SPICE, the impedance analysis unit 109 can analyze impedance if the impedance analysis unit 109 includes the function of executing circuit analysis using SPICE. When a power supply analysis model input by the impedance analysis unit 109 is an electromagnetic field analysis model using the FDTD method, the impedance analysis unit 109 can analyze impedance if the impedance analysis unit 109 includes the function of executing electromagnetic field analysis using the FDTD method.

The impedance analysis unit 109 then outputs the result of analysis of the impedance of the power supply circuit of the I/O buffer to the impedance judging unit 107.

Note that the impedance of the power supply circuit of the I/O buffer derived by the impedance analysis unit 109 may be frequency-dependent or frequency-independent and constant, depending on information used for the design of the power supply circuit of the I/O buffer.

The impedance judging unit 107 compares the impedance of the power supply circuit of the I/O buffer output from the impedance deriving unit 109 with the target impedance output from the target impedance deriving unit 102 to judge whether or not the impedance of the power supply circuit is smaller than the target impedance.

If the impedance of the power supply circuit differs from the target impedance in frequency dependence, the impedance judging unit 107 may perform the comparison by focusing on one of the impedance of the power supply circuit and the target impedance. For example, if the impedance of the power supply circuit is frequency-dependent and the target impedance is frequency-independent and constant, the impedance judging unit 107 may compare the impedances on the assumption that the target impedance is constant within the frequency range within which the impedance of the power supply circuit exhibits frequency dependence. Alternatively, the impedance judging unit 107 may compare the impedance of the power supply circuit at an I/O switching operation frequency with the target impedance.

The impedance judging unit 107 then outputs the judgment about the impedance of the power supply circuit and the target impedance to an output control unit 103. The judgment output from the impedance judging unit 107 is information indicating whether or not the impedance of the power supply circuit meets the target impedance as well as the exact impedance of the power supply circuit, the exact target impedance, a graph of comparison between the impedances, and other information.

The impedance judging unit 107 may output the judgment to the external storage device 20 and may update the circuit board information and the component information stored in the external storage device 20 in accordance with the judgment. For example, if the judgment is that the impedance of the power supply circuit of the I/O buffer does not meet the target impedance, the impedance judging unit 107 may write "errors" as the circuit board information and the component information in the external storage device 20. Furthermore, for example, if the circuit board information is CAD layout information and the user can check the layout features of the PCB through a user interface, the power supply circuit that does not meet the target impedance may be displayed on a CAD layout in such a way that the user can identify that the design is erroneous. Furthermore, the exact impedance of the power supply circuit, the exact target impedance, a graph of the comparison between the two impedances, and the like that have been used by the impedance judging unit 107 in the judgment that the design is erroneous may be displayed in response to selection of the error on the CAD layout by a user operation.

FIG. 12 is a diagram of a processing flow in the design support device 10 according to the fourth exemplary embodiment of the present invention.

The processing flow in the design support device 10 according to the fourth exemplary embodiment will be described with an example in which the design support device 10 derives a target impedance on the basis of various items of information stored in the storage unit 111 and circuit board information and component information stored in the external storage device 20.

First, the user performs a user operation on an external writer device, for example, to write circuit design information for an I/O buffer (jitter constraint information, and signal operating current design information such as the operating voltage of the I/O buffer, a terminal condition of an I/O receiver, the number of switching operations of the I/O buffer, and the signal transmission method for the I/O buffer) in the storage unit 111 of the design support device 10. Similarly, the user performs a user operation on the external writer device to write jitter-voltage correlation information in the storage unit 111 of the design support device 10. Similarly, the user performs a user operation on the external writer device to write circuit board information and component information in the external storage device 20.

Then the permissible power supply fluctuation deriving unit 101 of the design support device 10 retrieves the circuit design information (jitter constraint information) for the I/O buffer from the storage unit 111 (step S1). Additionally, the permissible power supply fluctuation deriving unit 101 retrieves the jitter-voltage correlation information from the storage unit 111 (step S1).

The permissible power supply fluctuation deriving unit 101 then derives a permissible power supply voltage fluctuation on the basis of the jitter-voltage correlation information retrieved from the storage unit 111 and the jitter constraint information, which is circuit design information for the I/O buffer (step S2). The permissible power supply fluctuation deriving unit 101 then outputs information indicating the derived permissible power supply voltage fluctuation to the target impedance deriving unit 102.

The signal operating current deriving unit 105 retrieves signal operating current design information such as the operating voltage of the I/O buffer, the termination condition for the I/O receiver, the number of switching operations of the I/O buffer, and the signal transmission method for the I/O buffer, and a calculation equation based on the signal transmission method from the storage unit 111 (step S6). The signal operating current deriving unit 105 then derives a signal operating current on the basis of the retrieved calculation equation and signal operating current design information (step S7). The signal operating current deriving unit 105 then outputs information indicating the derived signal operating current to the target impedance deriving unit 102.

The target impedance deriving unit 102 takes an input of the permissible power supply voltage fluctuation from the permissible power supply fluctuation deriving unit 101. The target impedance deriving unit 102 also takes an input of the information indicating the signal operating current from the signal operating current deriving unit 105.

The target impedance deriving unit 102 implements the function of executing division on the basis of information indicating a permissible power supply voltage fluctuation and signal operating current information, which is circuit design information for the I/O buffer, for example, by hardware, and divides the permissible power supply voltage fluctuation (absolute value) by the signal operating current (absolute value) to derive a target impedance (step S4). The target impedance deriving unit 102 then outputs information indicating the derived target impedance to the impedance judging unit 107.

In response to the processing at step S1 performed by the permissible power supply fluctuation deriving unit 101, the power supply analysis model generating unit 108 retrieves the circuit board information and the component information from the external storage device 20 (step S8). The power supply analysis model generating unit 108 then generates a power supply analysis model on the basis of the retrieved circuit board information and component information (step S9). The power supply analysis model generating unit 108 then outputs information indicating the generated power supply analysis model to the impedance analysis unit 109.

The impedance analysis unit 109 takes an input of the power supply analysis model information from the power supply analysis model generating unit 108 and derives an impedance of the power supply circuit on the basis of the input power supply analysis model information (step S10). The impedance analysis unit 109 then outputs information indicating the derived impedance of the power supply circuit to the impedance judging unit 107.

The impedance judging unit 107 takes an input of the target impedance from the target impedance deriving unit 102 and an input of the impedance of the power supply circuit from the impedance analysis unit 109 and compares the input target impedance and impedance of the power supply circuit with each other to judge whether or not the impedance of the power supply circuit is smaller than the target impedance (step S11). The impedance judging unit 107 then records the judgment in the external storage device 20 and updates the circuit board information and the component information on the basis of the judgment about the impedance of the power supply circuit and the target impedance (step S12). The impedance judging unit 107 outputs the judgment about the impedance of the power supply circuit and the target impedance to the output control unit 103.

The output control unit 103 takes an input of the judgment about the impedance of the power supply circuit and the target impedance from the impedance judging unit 107 and outputs the judgment to the output unit 110 on the basis of the input judgment (step S13).

Note that the processing performed by the permissible power supply fluctuation deriving unit 101 (steps S1 and S2) and the processing performed by the signal operating current deriving unit 105 (steps S6 and S7) are independent of each other and the order in which the processing by the permissible power supply fluctuation deriving unit 101 and the processing by the signal operating current deriving unit 105 are performed can be changed.

While the processing by the power supply analysis model generating unit 108 has been described being triggered by the processing by the permissible power supply fluctuation deriving unit 101 in the above-described exemplary embodiment, the trigger may be changed as necessary insofar that normal processing is performed. Furthermore, the order in which the processing by the permissible power supply fluctuation deriving unit 101, the signal operating current deriving unit 105 and the target impedance deriving unit 102 (steps S1, S2, S6, S7, and S4) and the processing by the power supply analysis model generating unit 108 and the impedance analysis unit 109 of the impedance deriving unit 106 (steps S8, S9 and S10) are performed may be changed as necessary insofar that normal processing is performed.

A processing flow in the design support device 10 according to an exemplary embodiment of the present invention has been described. The processing by the design support device 10 described above enables a designer who does not have a good knowledge of PCB design to easily judge whether or not a design meets a target impedance of a power supply circuit of an I/O buffer of a PCB, simply by providing circuit board information, which is CAD layout information, and component information, which is information about components to be mounted. Furthermore, if the design does not meet the target impedance, the designer can quantitatively evaluate at which frequency the impedance of the power supply circuit of the I/O buffer does not meet the target impedance and to what extent, because the circuit board information and the component information are updated in accordance with the judgment about the impedance.

While the design support device 10 according to an exemplary embodiment of the present invention has been described as including a storage unit 111, the storage unit 111 may be provided anywhere as long as the design support device 10 can acquire information stored in the storage unit 111.

The design support device 10 described in the exemplary embodiment of the present invention described above includes a computer system within the design support device 10. The process of the processing described above is stored on a computer-readable recording medium in the form of a program and the processing described above is accomplished by the computer reading and executing the program. The term computer-readable recording medium as used herein refers to a recording medium such as a magnetic disk, a magneto-optical disc, a CD-ROM, a DVD-ROM, and a semiconductor memory. The computer program may be distributed to computers through a communication line and a computer that has received the computer program may execute the program.

Furthermore, the program may be a program for implementing some of the functions described above.

Moreover, the program may be a so-called differential file (a differential program), which can be combined with a program already recorded in the computer system to implement the functions described above.

Samples

More specific samples of impedance design of a power supply circuit of an I/O buffer on a PCB using a design support device 10 according to the fourth exemplary embodiment of the present invention will be described next.

FIG. 14 is a diagram illustrating an example of a horizontal plane structure of a PCB.

Two packaged LSIs are mounted on the PCB. The two LSIs are a transmitting LSI 21 and a receiving LSI 22 and a signal is transmitted by a signal current 25 flowing through a signal interconnect 23. Mounted components 24 other than the LSIs mounted on the PCB include a terminating resistance which adjusts a termination condition of the signal interconnect, a decoupling condenser for minimizing power supply voltage fluctuations, and other components.

There are separate power supplies for feeding the transmitting LSI 21 and the receiving LSI 22 and the transmitting LSI 21 is fed from a transmitting IO power supply 26 and the receiving LSI 22 is fed from a receiving IO power supply 27. Each of the IO power supplies has a plane structure and is located on the PCB.

Figure 15:
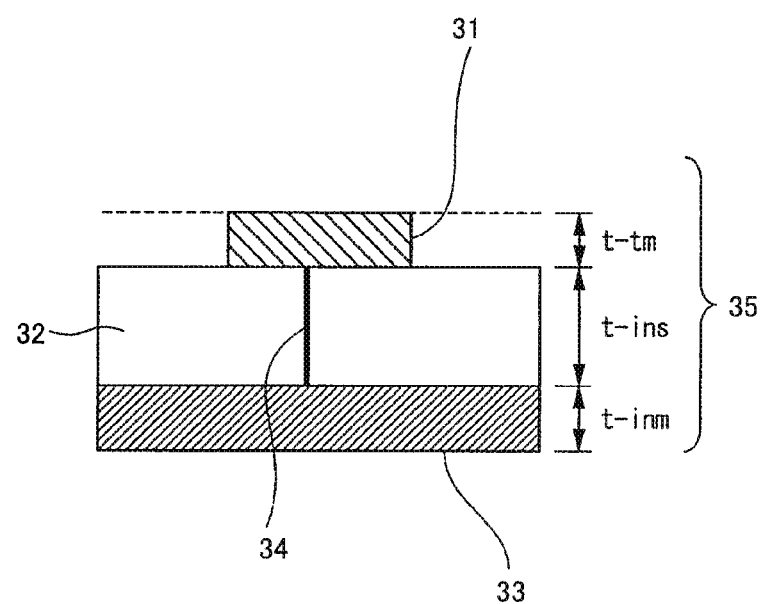
FIG. 15 is a cross-sectional view illustrating a PCB designed using the design support device according to the fourth exemplary embodiment.

FIG. 15 is a diagram illustrating an example of a cross-sectional structure of the PCB.

The PCB has a multilayer structure 35 in which a dielectric layer 32 is sandwiched between a plurality of conductor layers 31, 33. Component mounting pads for mounting signal interconnects and other components are provided on the surface conductor layer 31 of the PCB. Ground and power supply planes are built in the internal conductor layer 33 of the PCB. When electricity needs to be conducted between layers by connecting a power supply terminal of a component to the power supply plane and connecting a ground terminal to the ground plane, for example, the layers are interconnected through a via 34. Note that FIG. 15 depicts only minimum information about the cross-sectional structure of the PCB and in reality there are PCBs that have more complicated structures such as ones having more conductor layers.

It is assumed here that operating conditions are required of LSIs, including a switching operation frequency of 100 megahertz, an I/O buffer operating voltage of 1.8 volts, 16 I/O buffers that simultaneously perform switching operations, and the single-ended signaling signal transmission method. In addition, it is assumed that the output impedance of the transmitting LSI 21 is 50Ω and adjustments have been made using an interconnect structure and a mounted component (terminating resistance) 24 so that the characteristic impedance of the signal interconnect is 50Ω and the input impedance of the receiving LSI 22 is 50Ω in order to prevent impedance mismatching in signal transmission. In this case, information such as the operating voltage of the I/O buffers, the number of I/O buffers that simultaneously perform switching operations, an input impedance of 50Ω, and the single-ended signaling signal transmission method is signal operating current design information. It is also assumed that the jitter constraint for stably transmitting signals on the PCB is 100 picoseconds (one hundredth of 10 nanoseconds, which is the period at a switching frequency of 100 megahertz). These items of information are specifications required of LSIs in an early stage of PCB design and can be readily provided by a designer. By providing these items of information beforehand and using the design support device 10, a target impedance of the power supply circuits of I/O buffers can be derived in an early stage of PCB design. To derive the target impedance, the design support device 10 having the configuration illustrated in FIG. 11 and the flowchart illustrated in FIG. 12 are used.

It is assumed that the target impedance is obtained on the assumption that the impedance is constant at frequencies up to a frequency of 1 gigahertz which is a harmonic of a switching operation frequency of 100 megahertz. If items of information such as the signal operating current provided by the designer beforehand have different frequency dependencies, different target impedances for the different frequencies may be derived or a target impedance may be derived for a certain frequency such as the switching operation frequency. However, it is assumed here that the same signal operating current flows at the harmonics of the switching operation frequency and the target impedance as described previously is obtained in accordance with the design policy that taking into account harmonics up to the tenth harmonic is sufficient because this is an early stage of PCB design.

Figure 16:
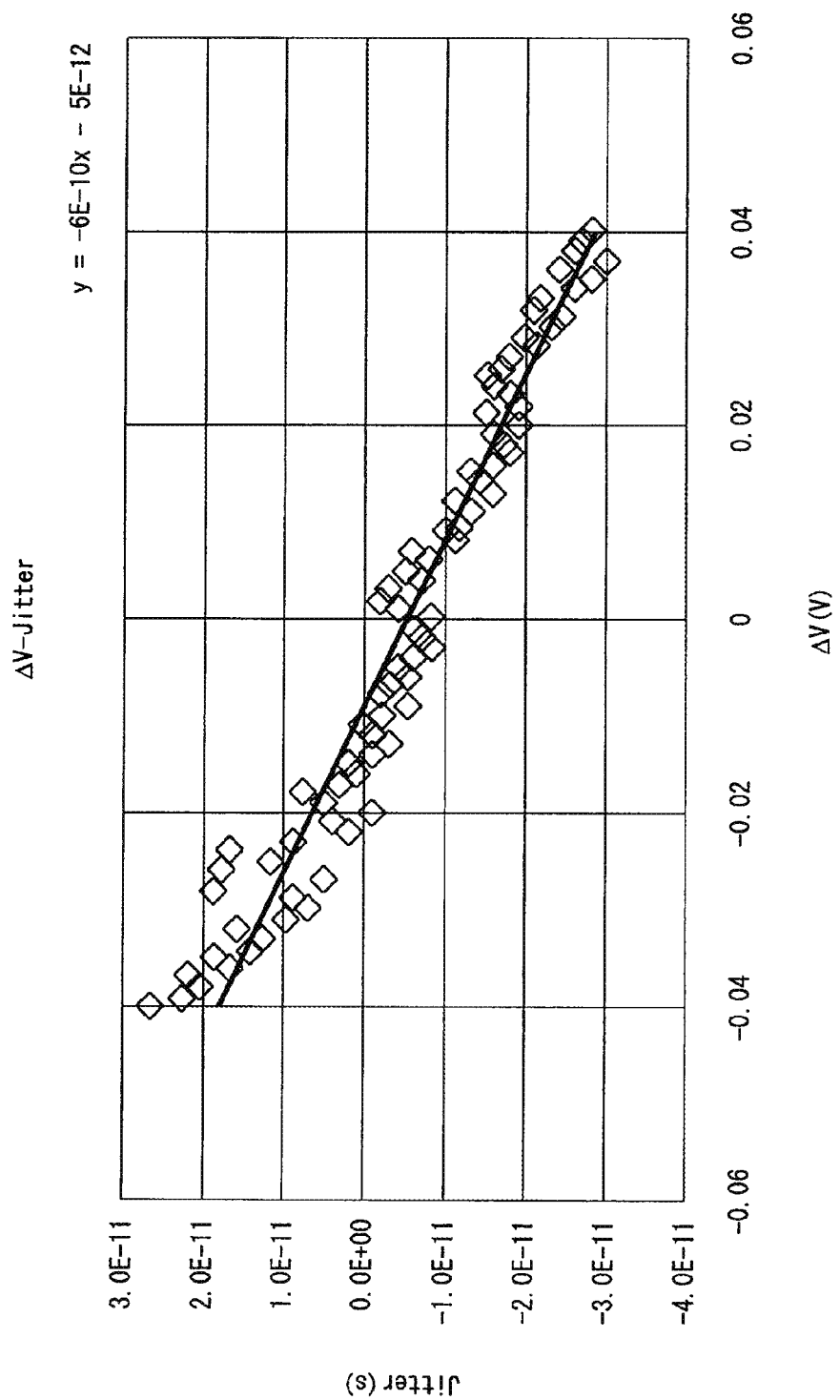
FIG. 16 is a graph illustrating an example of obtaining a jitter-voltage correlation equation using the design support device according to the fourth exemplary embodiment.

FIG. 16 is a graph illustrating an example in which a jitter-voltage correlation equation is obtained.

The storage unit 111 of the design support device 10 has stored beforehand a jitter-voltage correlation equation for an I/O buffer of interest (with an operating voltage of 1.8 volts, a switching operation frequency of 100 megahertz, and the single-ended signaling signal transmission method) through a user operation on the external writer device. Power supply voltage fluctuations $\Delta V$ and jitter in the I/O buffer are as follows: jitter changes as plotted as the "diamond" marks in FIG. 16 as $\Delta V$ changes from −0.04 volts to 0.04 volts (operating voltages of 1.76 volts to 1.84 volts). An approximation equation for jitter tj and voltage fluctuations Vd can be derived from Equation (2) as tj=−6−10×Vd−5−12. Since b is sufficiently small as compared with the jitter constraint, b can be considered to be 0. Accordingly, the relationship between the jitter constraint tjr and a permissible power supply fluctuation vdr is Vdr=|tjr/(−6−10)| from Equation (3), and it is assumed that this approximation equation has been provided as a jitter-voltage correlation equation.

A target impedance for the power supply circuit of an I/O buffer of the PCB is derived by a sequence of processing steps performed by the design support device 10 in accordance with the processing flow illustrated in FIG. 12.

The target impedance is derived by a sequence of processing steps S1, S2, S6, S7 and S4 performed by the permissible power supply fluctuation deriving unit 101, the signal operating current deriving unit 105, and the target impedance deriving unit 102 of the design support device 10.

The permissible power supply fluctuation deriving unit 101 retrieves circuit design information (jitter constraint information) and jitter-voltage correlation information (step S1). Specifically, the permissible power supply fluctuation deriving unit 101 retrieves a jitter constraint of 100 picoseconds and the jitter-voltage correlation equation Vdr=|tjr/(−6−10)| for the I/O buffer of interest from the storage unit 111.

The permissible power supply fluctuation deriving unit 101 then derives a permissible power supply voltage fluctuation (step S2). Specifically, the permissible power supply fluctuation deriving unit 101 derives a permissible voltage fluctuation Vdr=|100−12/(−6−10)|=|−167−31|=167 millivolts from a jitter constraint of 100 picoseconds and Vdr=|tjr/(−6−10)|. While Vdr here is a negative value and the power supply voltage changes in the negative direction (decreases from an operating voltage of 1.8 volts), Vdr is derived as an absolute value because the absolute quantity of fluctuation is required.

Then the signal operating current deriving unit 105 retrieves signal operating current design information and a calculation equation based on a signal transmission method. Specifically, the signal operating current deriving unit 105 retrieves signal operating current design information such as the operating voltage of the I/O buffers, the number of I/O buffers that simultaneously perform switching operations, an input impedance of 50Ω, and the single-ended signaling signal transmission method and Equation (4), which is a calculation equation for the single-ended signaling, from the storage unit 111.

The signal operating current deriving unit 105 then derives a signal operating current (step S7). Specifically, the signal operating current deriving unit 105 uses Equation (4) to derive a signal operation current, Ii=1.8×16/50=0.576=576 milliamperes.

Then the target impedance deriving unit 102 derives a target impedance (step S4). Specifically, from the permissible power supply fluctuation Vdr derived by the permissible power supply fluctuation deriving unit 101 and the signal operating current Ii derived by the signal operating current deriving unit 105, the target impedance deriving unit 102 divides the permissible power supply voltage fluctuation (absolute value) by the signal operating current (absolute value) to derive a target impedance, Zti=167/576≈0.289=289 milliohms.

In this way, the target impedance is derived by the sequence of processing steps S1, S2, S6, S7 and S4 performed by the design support device 10. Thus, the designer has only to design the power supply circuit of the I/O buffer on the PCB so that the target impedance is met.

Then an actual impedance of the power supply circuit of the I/O buffer on the PCB is derived by a sequence of processing steps performed by the design support device 10 in accordance with the processing flows illustrated in FIG. 12.

The impedance of the power supply circuit is derived by a sequence of processing steps S8, S9 and S10 performed by the power supply analysis model generating unit 108 and the impedance analysis unit 109 of the design support device 10. Note that the sequence of processing steps may be performed after a certain period of time has elapsed since the completion of the sequence of processing steps for estimating the target impedance described above or may be performed after the design of the PCB has progressed and the structure of the PCB relating to the power supply circuit of the I/O buffer has been determined to a certain extent.

It is assumed that in the stage where the sequence of processing steps is performed, circuit board information illustrated in FIGS. 14 and 15 and component information about the components to be mounted on the PCB illustrated in FIG. 14 have been recorded in the external storage device 20 as the design information for the PCB. The circuit board information is two-dimensional CAD layout information such as information about the horizontal structure of the PCB illustrated in FIG. 14 (such as information about the locations of conductors in each layer and connections to components) and layer structure information of the circuit board illustrated in FIG. 15 (such as layer configuration information 35 and electrical characteristics of each layer). The component information is information about the components to be mounted, illustrated in FIG. 14 (such as information about connections to the circuit board and electrical characteristics of the components). Determination as to which items of the circuit board information and the component information relate to the power supply circuit of the I/O buffer may be made by referring to attributes recorded in the two-dimensional CAD layout information, for example (for example attributes representing the power supply circuit of the I/O buffer and the ground are recorded in the plane of the conductor layer). Alternatively, the determination as to which items of the circuit board information and the component information relate to the power supply circuit of the I/O buffer may be made by extracting items of information that relate to the power supply circuit of the I/O buffer in accordance with attribute information from information about circuit board information of the PCB or information about components to be mounted on the PCB as illustrated in FIGS. 14 and 15.

As part of a sequence of processing steps for deriving the actual impedance of the power supply circuit of the I/O buffer, first the power supply analysis model generating unit 108 retrieves the circuit board information and the component information (step S8). Specifically, the power supply analysis model generating unit 108 retrieves circuit board information and component information about the PCB illustrated in FIGS. 14 and 15 which are recorded in the external storage device 20.

Then the power supply analysis model generating unit 108 generates a power supply analysis model (step S9). Specifically, the power supply analysis model generating unit 108 generates a power supply analysis model to be used for deriving the impedance of the power supply circuit of the I/O buffer, from the retrieved circuit board information and component information. It is assumed here that the power supply analysis model generating unit 108 includes functions such as a field solver (an equivalent circuit model generating means using an electromagnetic field analytical engine) which generates equivalent circuit models of a power supply plane and signal interconnects from the structures and electrical characteristics of a printed circuit board and interconnections, a component equivalent circuit model generation tool which generates equivalent circuit models of components from component information, and a circuit model combining tool which combines generated models to generate an equivalent circuit model of a power supply circuit of an I/O buffer. Such tools are included in many commercially available CAD tools and may be used as the functions.

Figure 17A:
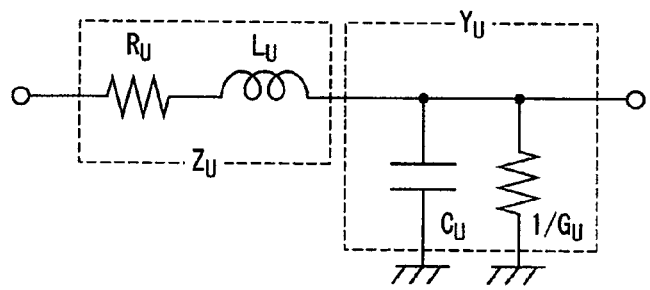
FIG. 17A is a circuit diagram illustrating an equivalent circuit of a power supply analysis model generated by a field solver included in a power supply analysis model generating unit depicted in FIG. 11.
Figure 17B:
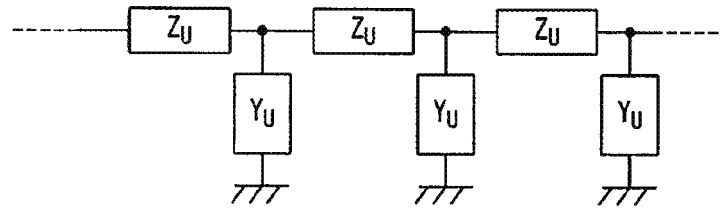
FIG. 17B is a diagram illustrating an interconnect model in which the equivalent circuits illustrated in FIG. 17A are connected in series.
Figure 17C:
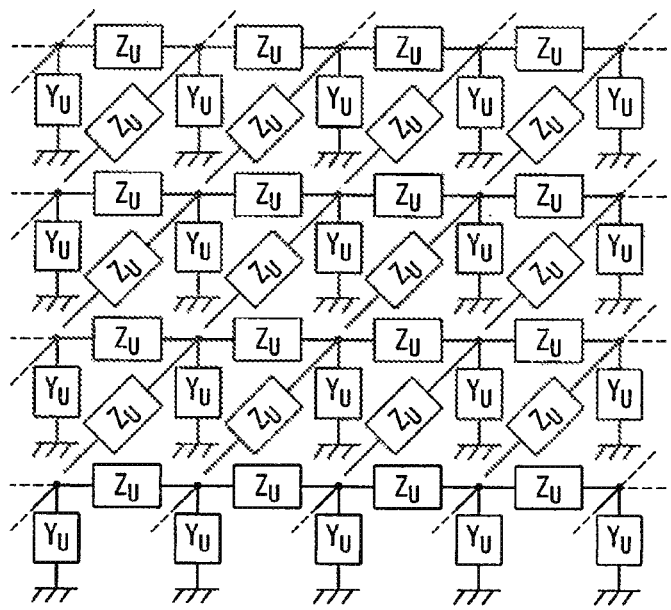
FIG. 17C is a diagram illustrating an interconnect model in which the equivalent circuits illustrated in FIG. 17A are connected two-dimensionally.

FIGS. 17A, 17B and 17C are diagrams illustrating examples of power supply analysis models generated by a field solver included in the power supply analysis model generating unit 108.

FIG. 17A illustrates an equivalent circuit of a unit length obtained by the field solver included in the power supply analysis model generating unit 108 and includes the impedance Zu of the unit length (the resistance Ru and the inductance Lu of the unit length) and the admittance Yu of the unit length (the capacitance Cu and the conductance Gu of the unit length).

FIG. 17B illustrates interconnect model of the equivalent circuits connected in series. FIG. 17C illustrates a plane model of the equivalent circuits connected two-dimensionally.

In general, signal interconnects in a power supply circuit of an I/O buffer can be represented by the interconnect model illustrated in FIG. 17B and a power supply plane on a circuit board can be represented by the plane model illustrated in FIG. 17C. Depending on a package structure, a package can be represented by an interconnect model as illustrated in FIG. 17B if the package uses a lead frame, like a DIP (Dual Inline Package), for example. If a signal interconnect is sufficiently long with respect to the wavelength of a signal to be handled, the transmission line may be represented by an equivalent circuit model in distributed-constant form (without a change in electrical characteristics of a unit length).

Figure 18:
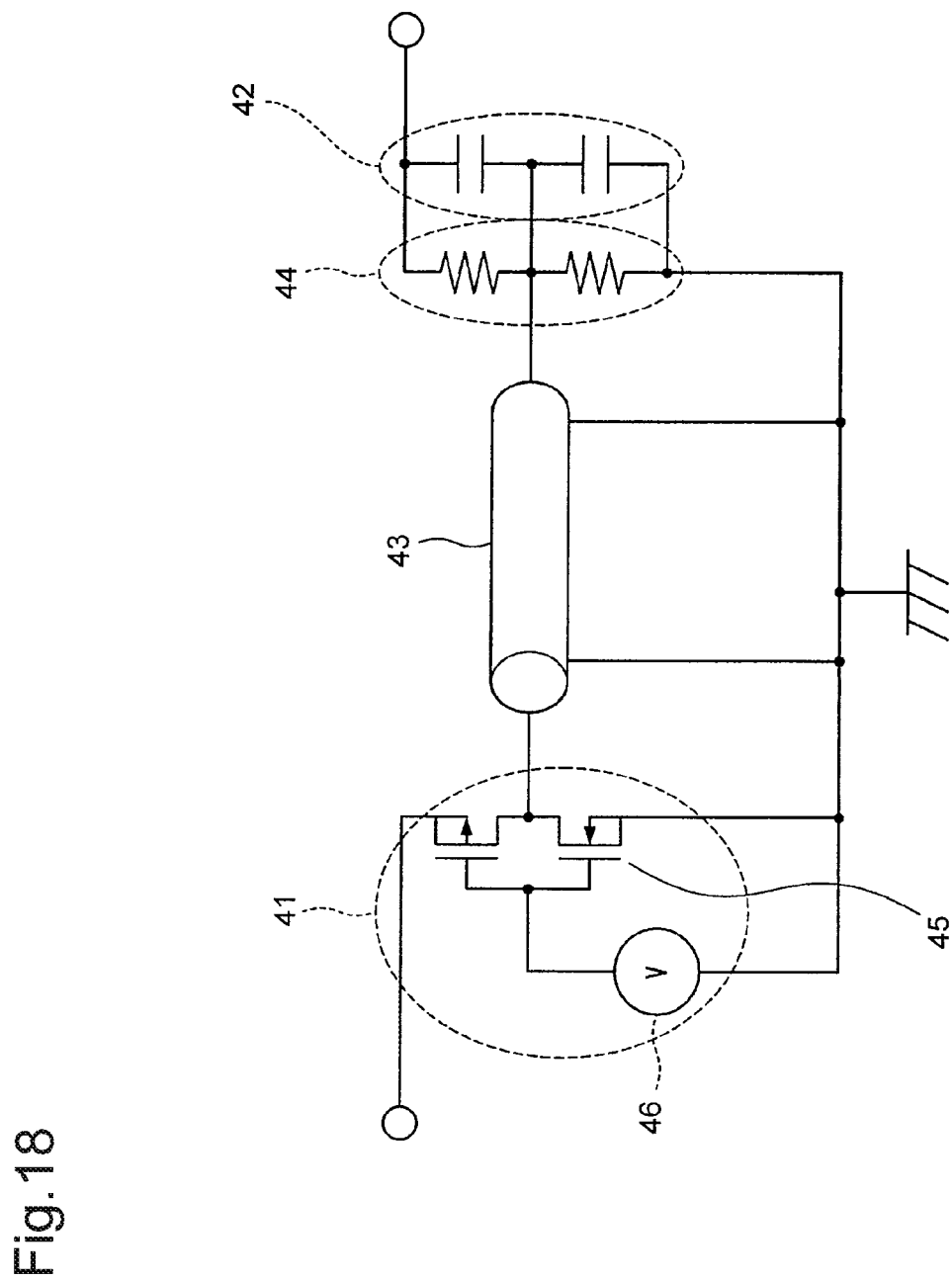
FIG. 18 is a circuit diagram illustrating an I/O input and output structure model using a signal interconnect model in transmission line form for a signal interconnect depicted in FIG. 14.

FIG. 18 is a diagram illustrating an example of an I/O input and output structure model using a signal interconnect model 43 in transmission line form for a signal interconnect 23 illustrated in FIG. 14.

The I/O input and output structure model illustrated in this figure has a model structure in which an I/O driver model 41, which is an equivalent circuit of an I/O driver (an output buffer) in a transmitting LSI 21, and an I/O receiver model 42, which is an equivalent circuit of an I/O receiver (an input buffer) in a receiving LSI 22, are interconnected by a signal interconnect model 43 and a terminating resistance model 44 for adjusting the input impedance of the I/O receiver is connected to the I/O receiver model 42. The I/O driver model 41 includes a driver buffer model 45 and a switching operation control power supply 46.

In the I/O driver model 41, transistors of the driver buffer model 45 repeatedly turn on and off in accordance with an output voltage (with a waveform with an amplitude of 1.8 volts that switches at 100 megahertz) of the switching operation control power supply 46 to output a signal that switches with 100 megahertz through the I/O driver. The I/O receiver model 42 is a model represented by a capacitance of the I/O receiver. The terminating resistance model has a structure in which a resistance element is connected to each of the power supply side and the ground side and adjusts the input impedance of the I/O receiver. The output impedance of the I/O driver, the input impedance determined by the I/O receiver and the terminating resistance, and the characteristic impedance of the signal interconnect are each designed to be 50 ohms. In the I/O input and output structure model illustrated in FIG. 18, the output impedance of the I/O driver model 41, the input impedance of the I/O receiver model 42, and the characteristic impedance of the signal interconnect model 43 each implement 50 ohms.

Figure 19:
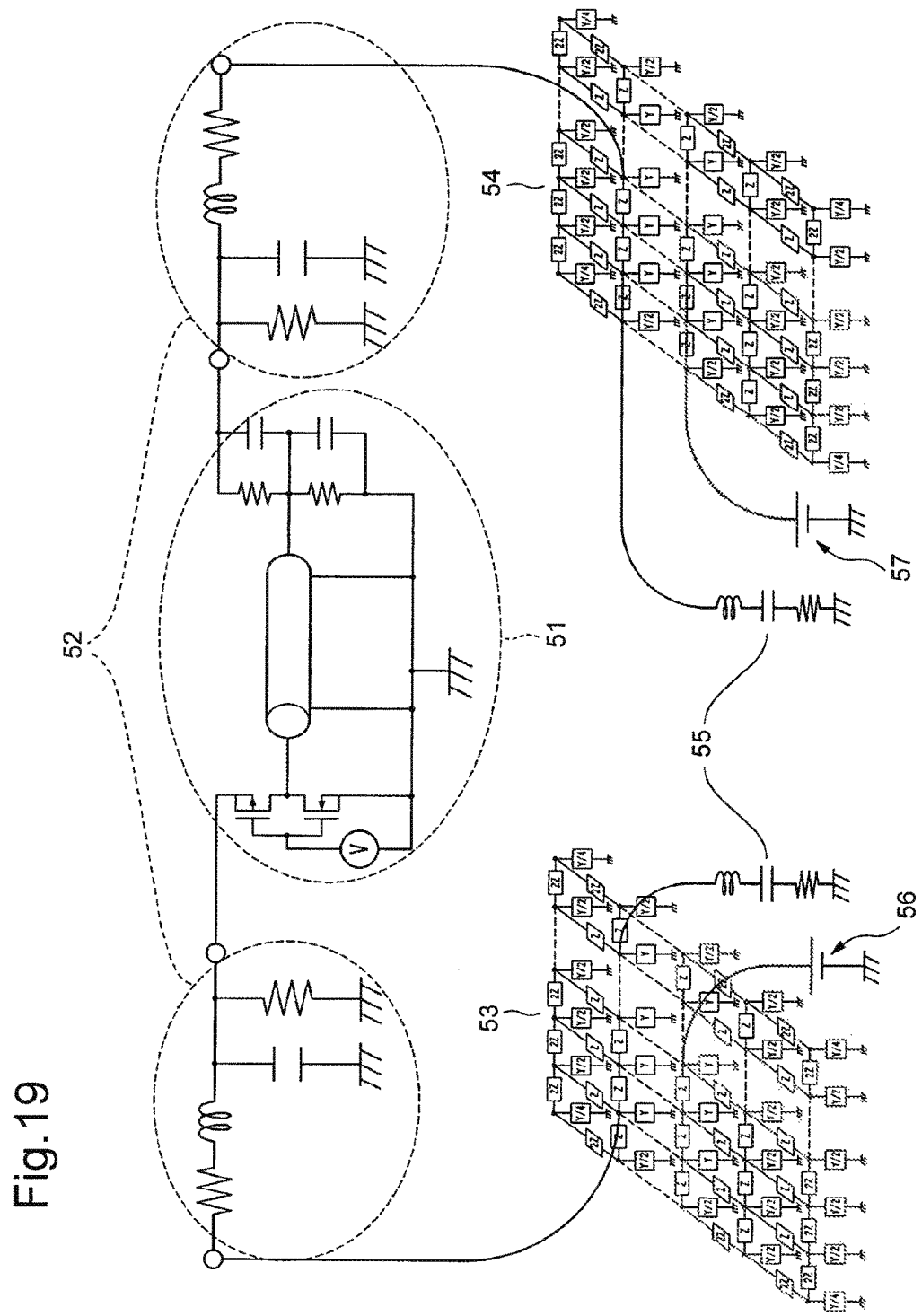
FIG. 19 is a diagram illustrating an example of a power supply analysis model generated by a power supply analysis model generating unit depicted in FIG. 11.

FIG. 19 is a diagram illustrating an example of a power supply analysis model generated by the power supply analysis model generating unit 108.

The power supply analysis model illustrated in this figure has a configuration in which package models 52 (the interconnect model illustrated in FIG. 17B), which are equivalent circuit models of components of the power supply circuit of an I/O buffer, I/O power supply plane models (a transmitting-side model 53 and a receiving-side model 54; the plane model illustrated in FIG. 17C), and component (capacitor) models 55 are connected to the I/O input and output structure model 51 illustrated in FIG. 18. Feed models (a transmitting-side feed model 56 and a receiving-side feed model 57), which is fed with 1.8-volt DC power, is connected to each of the transmitting-side I/O power supply plane model 53 and the receiving-side I/O power supply plane model 54. Note that while a minimum number of I/O input and output structure models 51, package models 52, and component models 55 are depicted in this figure, an actual model has more complicated form because of the number of I/O buffers that simultaneously switches and the number of components to be mounted.

Then the impedance analysis unit 109 derives an impedance of the power supply circuit (step S10). Specifically, the impedance analysis unit 109 includes an analytical engine, such as SPICE, that can analyze electrical characteristics using equivalent circuit models. The analytical engine included in the impedance analysis unit 109 may be a commercially available tool that is widely used. The impedance analysis unit 109 analyzes the power supply analysis model of the PCB illustrated in FIG. 19 to derive an impedance of the power supply circuit of the PCB. It is assumed in this example that impedances of the power supply circuit are obtained at harmonics in increments of 100 megahertz up to 1 gigahertz which is the tenth harmonic of a switching operation frequency of 100 megahertz.

Then a sequence of processing steps is performed by the design support device 10 in accordance with the processing flow illustrated in FIG. 12 to compare an impedance of the power supply circuit with a target impedance.

Figure 20:
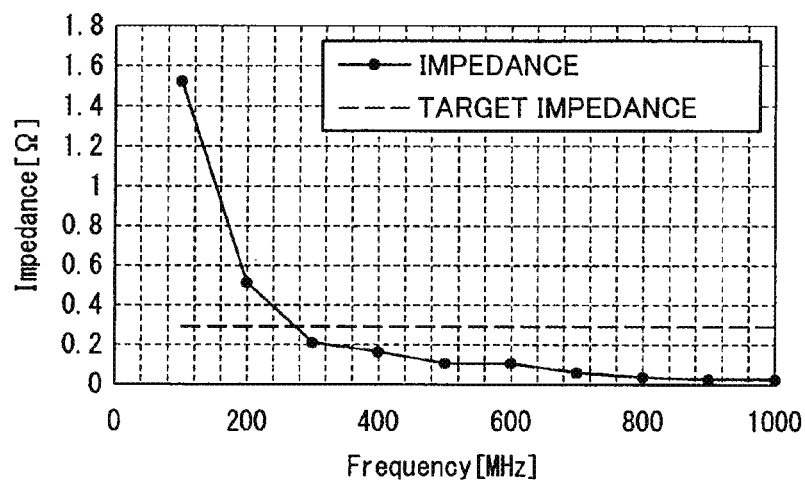
FIG. 20 is a graph illustrating an example of a judgment about an impedance of a power supply circuit and a target impedance made by the design support device according to the fourth exemplary embodiment.
Figure 21:
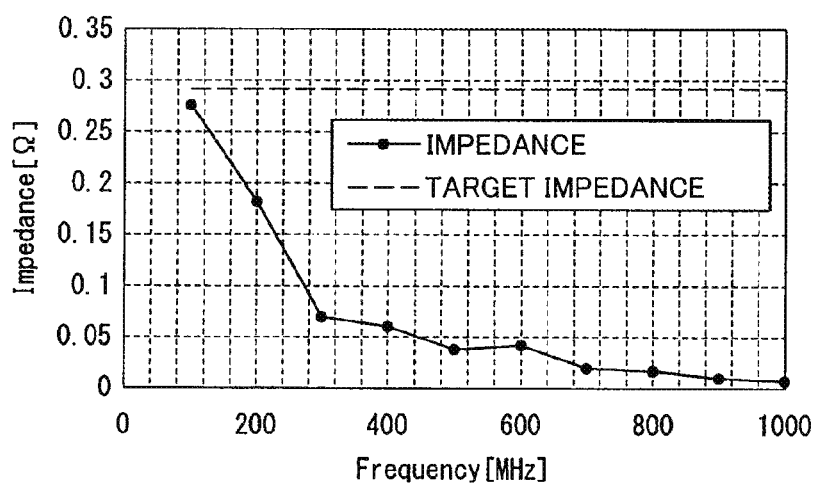
FIG. 21 is a graph illustrating another example of a judgment about an impedance of a power supply circuit and a target impedance made by the design support device according to the fourth exemplary embodiment.

Each of FIGS. 20 and 21 is a diagram illustrating an exemplary result of judgment about an impedance of the power supply circuit and a target impedance.

The impedance judging unit 107 compares the impedance of the power supply circuit with the target impedance to judge whether or not the impedance of the power supply circuit is smaller than the target impedance (step S11).

The impedances (solid lines) of the power supply circuit illustrated in FIGS. 20 and 21 were derived using the power supply analysis model illustrated in FIG. 19. The target impedances (dashed lines) illustrated in FIGS. 20 and 21 are values (289 milliohms) derived by the target impedance deriving unit 102 and are constant regardless of frequency.

In the example illustrated in FIG. 20, since the impedance of the power supply circuit exceeds the target impedance at frequencies in the frequency range greater than or equal to 100 megahertz and less than 300 megahertz, the impedance judging unit 107 judges that the impedance of the power supply circuit does not meet the target impedance. In the example illustrated in FIG. 21, the impedance judging unit 107 judges that the impedance of the power supply circuit is smaller than the target impedance at all frequencies greater than or equal to 100 megahertz.

Then a sequence of processing steps is performed by the design support device 10 in accordance with the processing flow illustrated in FIG. 12 to update circuit board information and component information in accordance with the judgment about the impedance of the power supply circuit and the target impedance.

The impedance judging unit 107 updates the circuit board information and the component information on the basis of the judgment about the impedance of the power supply circuit and the target impedance (step S12). Specifically, when the impedance judging unit 107 judges that the impedance of the power supply circuit of the I/O buffer does not meet the target impedance as illustrated in FIG. 20, the impedance judging unit 107 updates the circuit board information and the component information to indicate that there is an error in the circuit board information and the component information.

Furthermore, the designer can view the updated circuit board information and component information concerning the PCB as two-dimensional CAD layout information, for example, by clicking a layout of the circuit board or components constituting the power supply circuit of the I/O buffer, and an error message may be output when it has been judged that the impedance of the power supply circuit does not meet the target impedance.

Waveforms for comparison of the impedance of the power supply circuit and the target impedance as illustrated in FIG. 20 may be output along with the output error message.

When the impedance judging unit 107 judges that the impedance of the power supply circuit of the I/O buffer meets the target impedance as illustrated in FIG. 21, the impedance judging unit 107 updates the circuit board information and the component information to indicate that the target impedance is met on the basis of jitter constraint. Furthermore, the designer can view the information as two-dimensional CAD layout information, for example, by clicking a layout of the circuit board or components constituting the power supply circuit of the I/O buffer and, when it has been judged that the impedance of the power supply circuit meets the target impedance, an OK message may be output with the circuit board information and the component information of the PCB. Furthermore, waveforms for comparison of the impedance of the power supply circuit and the target impedance as illustrated in FIG. 21 may be output along with the output OK message.

Then the design support device 10 performs a sequence of processing steps in accordance with the processing flow illustrated in FIG. 12 to output the judgment.

The output control unit 103 takes an input of the judgment about the impedance of the power supply circuit and the target impedance from the impedance judging unit 107 and outputs the judgment to the output unit 110 on the basis of the input judgment (step S13). Specifically, when the impedance judging unit 107 judges that the impedance of the power supply circuit of the I/O buffer does not meet the target impedance as illustrated in FIG. 20, text information indicating that the target impedance is not met is output to the output unit 110. In this case, waveforms for comparison as illustrated in FIG. 20 may be output at the same time along with the text information.

When the impedance judging unit 107 judges that the impedance of the power supply circuit of the I/O buffer meets the target impedance as illustrated in FIG. 21, text information indicating that the target impedance is met is output to the output unit 110. In this case, waveforms for comparison as illustrated in FIG. 21 may be output at the same time along with the text information.

As has been described above, by a sequence of processing steps performed by the design support device 10 according to this sample, a target impedance for a power supply circuit of an I/O buffer can be derived in an early stage of PCB design. Furthermore, since judgment can be made in a later stage of the PCB design as to whether or not the impedance of a power supply circuit on the designed PCB meets the target impedance, it can be easily checked midway through the design process whether or not the design has been properly carried out. Moreover, the design support device 10 can output waveforms for comparison between the impedance of a power supply circuit on the designed PCB and the target impedance as illustrated in FIGS. 20 and 21 to allow the designer to determine by how much margin the designed impedance of the power supply circuit on the PCB differs from the target impedance. Furthermore, even a designer who does not have a good knowledge of PCB design can easily design a power supply circuit of a PCB because processing for deriving a target impedance and deriving a power supply circuit impedance is enabled to be performed simply by providing specifications for LSIs in an early stage of PCB design and providing two-dimensional CAD layout information, layer structure information of the PCB and information about components to be mounted in midway of the design.

Note that the present invention is not limited to the exemplary embodiments and samples described above. For example, the same or similar device or method can be used to design not only a power supply circuit of an I/O buffer of an LSI but also a core power supply circuit of an LSI. Jitter constraints in that case are, for example, jitter constraints for a stable operation of a PLL (Phase Locked Loop) connected to the core power supply circuit, instead of permissible values of jitter in an operating signal in the I/O buffer under power supply voltage fluctuations in the I/O buffer.

All or part of the exemplary embodiments disclosed above can be described as, but not limited to, the following supplementary notes.

Supplementary Note 1

A design support device including:
a permissible power supply fluctuation deriving unit deriving a permissible power supply voltage fluctuation on the basis of jitter-voltage correlation information indicating correlation between a power supply voltage fluctuation occurring in an I/O buffer and jitter generated by the power supply voltage fluctuation and jitter constraint information for stably transmitting a signal against generated jitter; and
a target impedance deriving unit deriving a target impedance on the basis of information indicating a signal operating current flowing through a power supply circuit of the I/O buffer and the power supply voltage fluctuation, the target impedance being an impedance of the power supply circuit in a permissible range.

Supplementary Note 2

The design support device according to Supplementary Note 1, including a signal operating current deriving unit deriving a signal operating current from design information for the signal operating current by using a calculation equation based on a provided signaling method, the design information including an operating voltage of the I/O buffer, a termination condition for an I/O receiver, the number of switching operations of the I/O buffer, and a signaling method of the I/O buffer.

Supplementary Note 3

The design support device according to Supplementary Note 1 or 2, including:
an impedance deriving unit deriving an impedance of the power supply circuit; and
an impedance judging unit comparing the impedance of the power supply circuit with the target impedance to judge whether or not the impedance of the power supply circuit is smaller than the target impedance.

Supplementary Note 4

The design support device according to any one of Supplementary Notes 1 to 3, wherein the permissible power supply fluctuation deriving unit derives the permissible power supply voltage fluctuation on the basis of a jitter-voltage correlation equation, the jitter-voltage correlation equation being an approximation equation representing a relationship between the power supply voltage fluctuation occurring in the I/O buffer and jitter generated by the power supply voltage fluctuation.

Supplementary Note 5

The design support device according to any one of Supplementary Notes 1 to 4, wherein the target impedance deriving unit derives the target impedance from the signal operating current and the permissible power supply voltage fluctuation by using a calculation equation based on a relationship between voltage and current.

Supplementary Note 6

The design support device according to Supplementary Note 3, wherein the impedance deriving unit generates a power supply analysis model representing an equivalent circuit model of a power supply circuit of a printed circuit board from circuit board information including a structure and an electrical characteristic of the printed circuit board and component information including a structure and an electrical characteristic of a component to be mounted on the printed circuit board and performs analysis by using the power supply analysis model to derive an impedance of the power supply circuit.

Supplementary Note 7

The design support device according to Supplementary Note 3, wherein the impedance judging unit updates the circuit board information and the component information stored in a storage unit by reflecting the judgment of the impedance judging unit.

Supplementary Note 8

A design support method including:
deriving a permissible power supply voltage fluctuation on the basis of jitter-voltage correlation information indicating correlation between a power supply voltage fluctuation occurring in an I/O buffer and jitter generated by the power supply voltage fluctuation and jitter constraint information for stably transmitting a signal against generated jitter; and
deriving a target impedance on the basis of information indicating a signal operating current flowing through a power supply circuit of the I/O buffer and the power supply voltage fluctuation, the target impedance being an impedance of the power supply circuit in a permissible range.

Supplementary Note 9

The design support method according to Supplementary Note 8, wherein a signal operating current is derived from design information for the signal operating current by using a calculation equation based on a provided signaling method, the design information including an operating voltage of the I/O buffer, a termination condition for an I/O receiver, the number of switching operations of the I/O buffer, and a signaling method of the I/O buffer.

Supplementary Note 10

The design support method according to Supplementary Note 8 or 9,
wherein an impedance of the power supply circuit is derived; and
the impedance of the power supply circuit is compared with the target impedance to judge whether or not the impedance of the power supply circuit is smaller than the target impedance.

Supplementary Note 11

The design support method according to any one of Supplementary Notes 8 to 10, wherein the permissible power supply voltage fluctuation is derived on the basis of a jitter-voltage correlation equation, the jitter-voltage correlation equation being an approximation equation representing a relationship between the power supply voltage fluctuation occurring in the I/O buffer and jitter generated by the power supply voltage fluctuation.

Supplementary Note 12

The design support method according to any one of Supplementary Notes 8 to 11, wherein the target impedance is derived from the signal operating current and the permissible power supply voltage fluctuation by using a calculation equation based on a relationship between voltage and current.

Supplementary Note 13

The design support method according to Supplementary Note 10, wherein a power supply analysis model representing an equivalent circuit model of a power supply circuit of a printed circuit board is generated from circuit board information including a structure and an electrical characteristic of the printed circuit board and component information including a structure and an electrical characteristic of a component to be mounted on the printed circuit board and analysis is performed by using the power supply analysis model to derive an impedance of the power supply circuit.

Supplementary Note 14

The design support method according to Supplementary Note 10, wherein the circuit board information and the component information stored in a storage unit are updated by reflecting the judgment.

Supplementary Note 15

A program causing a computer of a printed circuit board design support device to function as:

permissible power supply fluctuation deriving means for deriving a permissible power supply voltage fluctuation on the basis of jitter-voltage correlation information indicating correlation between a power supply voltage fluctuation occurring in an I/O buffer and jitter generated by the power supply voltage fluctuation and jitter constraint information for stably transmitting a signal against generated jitter; and target impedance deriving means for deriving a target impedance on the basis of information indicating a signal operating current flowing through a power supply circuit of the I/O buffer and the power supply voltage fluctuation, the target impedance being an impedance of the power supply circuit in a permissible range.

Supplementary Note 16

The program according to Supplementary Note 15, causing the computer to function as:

signal operating current deriving means for deriving a signal operating current from design information for the signal operating current by using a calculation equation based on a provided signaling method, the design information including an operating voltage of the I/O buffer, a termination condition for an I/O receiver, the number of switching operations of the I/O buffer, and a signaling method of the I/O buffer.

Supplementary Note 17

The program according to Supplementary Note 15 or 16, causing the computer to function as:

impedance deriving means for deriving an impedance of the power supply circuit; and impedance judging means for comparing the impedance of the power supply circuit with the target impedance to judge whether or not the impedance of the power supply circuit is smaller than the target impedance.

Supplementary Note 18

The program according to any one of Supplementary Notes 15 to 17, wherein the permissible power supply fluctuation deriving means derives the permissible power supply voltage fluctuation on the basis of a jitter-voltage correlation equation, the jitter-voltage correlation equation being an approximation equation representing a relationship between the power supply voltage fluctuation occurring in the I/O buffer and jitter generated by the power supply voltage fluctuation.

Supplementary Note 19

The program according to any one of Supplementary Notes 15 to 18, wherein the target impedance deriving means derives the target impedance from the signal operating current and the permissible power supply voltage fluctuation by using a calculation equation based on a relationship between voltage and current.

Supplementary Note 20

The program according to Supplementary Note 17, wherein the impedance deriving means generates a power supply analysis model representing an equivalent circuit model of a power supply circuit of a printed circuit board from circuit board information including a structure and an electrical characteristic of the printed circuit board and component information including a structure and an electrical characteristic of a component to be mounted on the printed circuit board and performs analysis by using the power supply analysis model to derive an impedance of the power supply circuit.

Supplementary Note 21

The program according to Supplementary Note 17, causing the impedance judging means to function as means for updating the circuit board information and the component information stored in a storage unit by reflecting the judgment by the impedance judging means.

This application is based upon and claims the benefit of priority from Japanese Patent Application No. 2013-5962 filed in Japan on Jan. 17, 2013 and the contents of which are incorporated herein.

INDUSTRIAL APPLICABILITY

The present invention is applicable to a design support device for designing a structure of a printed circuit board and facilitates estimation of a target impedance which is an impedance of a power supply circuit in a permissible range in an early stage of PCB design.

REFERENCE SIGNS LIST

10 . . . Design support device
20 . . . External storage device
21 . . . Transmitting LSI
22 . . . Receiving LSI
23 . . . Signal interconnect
24 . . . Component to be mounted
25 . . . Signal current
26 . . . Transmitting-side I/O power supply
27 . . . Receiving-side I/O power supply
31 . . . Surface conductor layer 32 . . . Dielectric layer
33 . . . Internal conductor layer
34 . . . Via
35 . . . Layer configuration
41 . . . I/O driver model
42 . . . I/O receiver model
43 . . . Signal interconnect model
44 . . . Terminating resistance model
45 . . . Driver buffer model
46 . . . Switching operation control power supply
51 . . . I/O input and output structure model
52 . . . Package model
53 . . . Transmitting-side I/O power supply plane model
54 . . . Receiving-side I/O power supply plane model
55 . . . Component model
56 . . . Transmitting-side feed model
57 . . . Receiving-side feed model
101 . . . Permissible power supply fluctuation deriving unit
102 . . . Target impedance deriving unit
103 . . . Output control unit
105 . . . Signal operating current deriving unit
106 . . . Impedance deriving unit
107 . . . Impedance judging unit
108 . . . Power supply analysis model generating unit
109 . . . Impedance analysis unit
110 . . . Output unit
111 . . . Storage unit

The invention claimed is:

1. A design support device comprising:
a storage storing jitter-voltage correlation information indicating a correlation between a power supply voltage fluctuation occurring in an I/O buffer and jitter generated by the power supply voltage fluctuation, jitter constraint information for stably transmitting a signal against generated jitter, and information indicating a signal operating current flowing through a power supply circuit of the I/O buffer;
a processor executing functions of
a permissible power supply fluctuation deriving unit deriving a permissible power supply voltage fluctuation on the basis of the jitter-voltage correlation information and the jitter constraint information;
a target impedance deriving unit deriving a target impedance on the basis of the information indicating a signal operating current flowing and the power supply voltage fluctuation, the target impedance being an impedance of the power supply circuit in a permissible range; and
a display displaying the target impedance, wherein the power supply voltage fluctuation is a power supply voltage fluctuation obtained in a worst case where design conditions are severest.

2. The design support device according to claim 1, comprising a signal operating current deriving unit deriving a signal operating current from design information for the signal operating current by using a calculation equation based on a provided signaling method, the design information including an operating voltage of the I/O buffer, a termination condition for an I/O receiver, the number of switching operations of the I/O buffer, and a signaling method of the I/O buffer.

3. The design support device according to claim 1, comprising:
an impedance deriving unit deriving an impedance of the power supply circuit; and
an impedance judging unit comparing the impedance of the power supply circuit with the target impedance to judge whether or not the impedance of the power supply circuit is smaller than the target impedance.

4. The design support device according to claim 1, wherein the permissible power supply fluctuation deriving unit derives the permissible power supply voltage fluctuation on the basis of a jitter-voltage correlation equation, the jitter-voltage correlation equation being an approximation equation representing a relationship between the power supply voltage fluctuation occurring in the I/O buffer and jitter generated by the power supply voltage fluctuation.

5. The design support device according to claim 1, wherein the target impedance deriving unit derives the target impedance from the signal operating current and the permissible power supply voltage fluctuation by using a calculation equation based on a relationship between voltage and current.

6. A design support method comprising:
storing jitter-voltage correlation information indicating a correlation between a power supply voltage fluctuation occurring in an I/O buffer and jitter generated by the power supply voltage fluctuation, jitter constraint information for stably transmitting a signal against generated jitter, and information indicating a signal operating current flowing through a power supply circuit of the I/O buffer;
deriving using a processor a permissible power supply voltage fluctuation on the basis of the jitter-voltage correlation information and the jitter constraint information;
deriving using the processor a target impedance on the basis of the information indicating a signal operating current flowing and the power supply voltage fluctuation, the target impedance being an impedance of the power supply circuit in a permissible range; and
displaying on a display the target impedance, wherein the power supply voltage fluctuation is a power supply voltage fluctuation obtained in a worst case where design conditions are severest.

7. The design support method according to claim 6, wherein a signal operating current is derived from design information for the signal operating current by using a calculation equation based on a provided signaling method, the design information including an operating voltage of the I/O buffer, a termination condition for an I/O receiver, the number of switching operations of the I/O buffer, and a signaling method of the I/O buffer.

8. The design support method according to claim 6,
wherein an impedance of the power supply circuit is derived; and
the impedance of the power supply circuit is compared with the target impedance to judge whether or not the impedance of the power supply circuit is smaller than the target impedance.

9. A non-transitory computer readable medium embodying a program causing a computer of a printed circuit board design support device to function as:
a storage storing jitter-voltage correlation information indicating a correlation between a power supply voltage fluctuation occurring in an I/O buffer and jitter generated by the power supply voltage fluctuation, jitter constraint information for stably transmitting a signal against generated jitter, and information indicating a signal operating current flowing through a power supply circuit of the I/O buffer;
a processor executing functions of
a permissible power supply fluctuation deriving unit deriving a permissible power supply voltage fluctuation on the basis of the jitter-voltage correlation information and the jitter constraint information;

a target impedance deriving unit deriving a target impedance on the basis of the information indicating a signal operating current flowing and the power supply voltage fluctuation, the target impedance being an impedance of the power supply circuit in a permissible range; and a display displaying the target impedance, wherein the power supply voltage fluctuation is a power supply voltage fluctuation obtained in a worst case where design conditions are severest.

10. The non-transitory computer readable medium according to claim 9, embodying the program causing the computer to function as:

signal operating current deriving unit deriving a signal operating current from design information for the signal operating current by using a calculation equation based on a provided signaling method, the design information including an operating voltage of the I/O buffer, a termination condition for an I/O receiver, the number of switching operations of the I/O buffer, and a signaling method of the I/O buffer.

* * * * *